United States Patent
Labbe

(10) Patent No.: US 11,198,486 B2
(45) Date of Patent: Dec. 14, 2021

(54) CLIP FOR AND METHOD OF ADJUSTING SKI POSITION

(71) Applicant: BOMBARDIER RECREATIONAL PRODUCTS INC., Valcourt (CA)

(72) Inventor: Christian Labbe, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 304 days.

(21) Appl. No.: 16/272,092

(22) Filed: Feb. 11, 2019

(65) Prior Publication Data

US 2019/0256170 A1 Aug. 22, 2019

Related U.S. Application Data

(60) Provisional application No. 62/632,134, filed on Feb. 19, 2018.

(51) Int. Cl.
*B62M 27/02* (2006.01)

(52) U.S. Cl.
CPC ....... *B62M 27/02* (2013.01); *B62M 2027/025* (2013.01); *B62M 2027/026* (2013.01)

(58) Field of Classification Search
CPC . A63C 7/1066; A63C 5/031; Y10T 24/44034; Y10T 24/44043; B62M 2027/025; B62H 1/14; B62B 17/02
USPC .......................... 180/182, 190; 280/601, 845
See application file for complete search history.

(56) References Cited

U.S. PATENT DOCUMENTS

| | | | | |
|---|---|---|---|---|
| 838,867 A * | 12/1906 | Lalus | ..................... | A47H 13/00 160/330 |
| 4,747,170 A * | 5/1988 | Knouse | ................. | A61G 7/1026 24/460 |
| 5,309,604 A * | 5/1994 | Poulsen | .............. | A61M 5/1418 24/16 R |
| 5,752,297 A * | 5/1998 | Ramey | .................. | E04H 15/644 24/460 |
| 6,311,798 B1 | 11/2001 | Anderson | | |
| 6,405,414 B1 * | 6/2002 | Byrnes | .................. | A61M 25/00 24/339 |
| 6,672,299 B2 * | 1/2004 | Proctor | ................... | F41B 5/066 124/86 |

(Continued)

FOREIGN PATENT DOCUMENTS

JP 2852529 B2 * 2/1999
WO WO-2020083806 A1 * 4/2020 ............ B62M 27/02

*Primary Examiner* — Minnah L Seoh
*Assistant Examiner* — Myles A Harris
(74) *Attorney, Agent, or Firm* — BCF LLP

(57) ABSTRACT

A clip for selectively setting a position of a snowmobile ski and a method for adjusting the position. A snowmobile, snowmobile ski assembly, adjustment kit, and a method to adjust snowmobile ski stance also disclosed. The clip includes a connecting portion for selectively to the ski bolt, the connecting portion defining a space having an opening span less than a diameter of the ski bolt, and a central span greater than the opening span, at least one member of the connecting portion being deflected during connection to the ski bolt; and a gripping portion. The method includes removing the clip from the ski bolt on a first side of the ski leg, sliding the ski laterally relative to the ski leg along the ski bolt, and connecting the clip to the ski bolt on a second side of the ski leg.

18 Claims, 22 Drawing Sheets

(56) References Cited

U.S. PATENT DOCUMENTS

| | | | | |
|---|---|---|---|---|
| 6,691,382 | B1* | 2/2004 | Su | B65D 7/20 |
| | | | | 24/335 |
| 6,860,352 | B2 | 3/2005 | Mallette et al. | |
| 6,955,237 | B1 | 10/2005 | Przekwas et al. | |
| 7,093,858 | B1* | 8/2006 | Russell | F16L 1/11 |
| | | | | 248/68.1 |
| 7,374,188 | B2* | 5/2008 | Hibbert | B62M 27/02 |
| | | | | 180/190 |
| 7,921,527 | B2* | 4/2011 | Moy | A47K 10/14 |
| | | | | 24/462 |
| 8,177,736 | B2* | 5/2012 | Kopperschmidt | A61M 1/3655 |
| | | | | 604/6.16 |
| D704,769 | S * | 5/2014 | Penington | D19/81 |
| 2002/0135141 | A1* | 9/2002 | Ouellette | B62K 13/00 |
| | | | | 280/7.14 |
| 2003/0015177 | A1* | 1/2003 | Scollard | F02M 69/465 |
| | | | | 123/470 |
| 2012/0242071 | A1* | 9/2012 | Coleman | A63C 5/16 |
| | | | | 280/818 |

* cited by examiner

CLIP FOR AND METHOD OF ADJUSTING SKI POSITION

CROSS-REFERENCE

The present application claims priority from U.S. Provisional Patent Application No. 62/632,134, entitled "Clip for and Method of Adjusting Ski Position," filed Feb. 19, 2018, the entirety of which is incorporated herein by reference.

TECHNICAL FIELD

The present technology relates to snowmobile skis.

BACKGROUND

Snowmobiles are recreational vehicles for use on snow-covered terrain.

Snowmobiles can be operated on groomed trails made up of smooth, packed snow, as well as in deep, unpacked snow. In different conditions, the snowmobile is often operated differently. The arrangement of the snowmobile skis, including the separation between the skis (referred to as the stance), may be configurable to be better matched to different modes of operation.

For example, in deep, unpacked snow, riders often utilize counter-steering. For counter-steering, a more narrow stance where the skis are closer together is preferable for reasons including the reduced force necessary to counter-steer. On groomed trails on the other hand, a wider stance (skis being farther apart) is generally preferred for better control and stability.

In some snowmobiles, the spacing between skis is adjustable. In some such snowmobiles, to adjust the stance the skis are removed and a spacer is displaced from one side of the snowmobile ski leg to the other. The skis are then reattached to the ski legs. In some other snowmobiles, the skis are removed to allow a change to the orientation of a bushing. In either case, in order to adjust the ski spacing, the skis must be removed from the ski legs. This generally requires a rider or operator to have the proper tools on hand, as well as the capability to lift or prop up the snowmobile.

While some riders may determine which stance will be preferred for a particular ride before leaving (in order to perform the adjustments before hand), it is often the case that different conditions are encountered during a particular ride. For example, the rider may plan on riding in deep snow conditions, but will be required to take a groomed trail to get to the deep snow destination. In such a case, the rider may be riding for a substantial portion of the ride without their preferred ski stance.

Other riders may decide to adjust the ski stance when each different condition is encountered to always have their preferred stance. This would require, however, that the rider bring all of the necessary tools on each ride. Additionally, adjustments would have to be made on the trail. Further, if the conditions change several times during a particular ride, the rider might find that a significant amount of the time of a particular ride may be spent making adjustments, instead of enjoying their snowmobile ride.

Therefore there is a desire for a way to adjust ski separation without some of the inconveniences of the prior art.

SUMMARY

One object of the present is to ameliorate at least some of the inconveniences of the prior art.

One broad aspect of the present technology provides a device and a method to allow a rider to adjust the ski stance, specifically the relative position of a snowmobile ski to a ski leg, without the use of tools and without removing or disconnecting the ski from the ski leg. The device is a clip that is selectively connected to the ski bolt to one side of the ski leg. Depending on the placement of the clip on the bolt, specifically to which side of the ski leg it is connected, the ski will be in a different lateral position. The clip is removed and connected to the ski bolt without the use of tools, and without the need to disconnect any of the ski, the ski bolt, or the ski leg. In order to change the ski stance, one clip is simply removed from one side of the ski leg, the ski is slid laterally into its desired position, and the clip is then reconnected to the ski bolt (opposite its previous position). The same is then done for the other ski. As such, the ski stance can be changed, even on the trail during a particular outing, without being required to bring all necessary tools, without needing to lift or prop up the snowmobile, and in a generally time efficient manner.

In accordance with one aspect of the present technology, there is provided a clip for selectively setting a position of a snowmobile ski with respect to a corresponding snowmobile ski leg, the ski leg being pivotably and slidably connected to the ski by a ski bolt. The clip includes a connecting portion for selectively connecting the clip to the ski fastener, the connecting portion defining a space for receiving the ski fastener therein, the space having: an opening having an opening span being less than a diameter of the ski fastener, and a central span greater than the opening span, the connecting portion including at least one resilient member, the at least one resilient member being deflected during connection of the clip to the ski fastener.

In some implementations, the clip further includes a gripping portion extending from the connecting portion.

In some implementations, the clip further includes a clip body extending from the connecting portion and the clip body defines an aperture for securing the clip to the ski.

In some implementations, the aperture is an oblong aperture for receiving therethrough a fastener connected to the ski; and the clip, when connected to the ski, is pivotable about the fastener.

In some implementations, the clip further includes a gripping portion extending from the connecting portion; and the gripping portion and the aperture are disposed on opposite sides of the connecting portion.

In some implementations, the gripping portion and the aperture are disposed on opposite sides of the connecting portion.

In some implementations, the clip further includes at least one flexible member connected at a first end to the clip, a second end of the at least one flexible member being adapted for connecting to the ski.

In some implementations, the connecting portion is generally C-shaped.

In some implementations, a bottom portion of the at least one resilient member is chamfered.

In some implementations, a lower end of the at least one resilient member is flared outward away from the space.

In some implementations, the at least one resilient member is a first resilient member; the connecting portion further comprises a second resilient member; and the opening span is defined by a minimum distance between a free end of the first resilient member and a free end of the second resilient member.

In some implementations, the clip further includes a rib extending between the first resilient member and the second resilient member, the rib being disposed on a side of the space opposite the opening of the space, the rib having a radius of curvature to match an exterior of the ski bolt.

In some implementations, the clip further includes a rib extending between the first resilient member and the second resilient member; and the first resilient member, the rib, and the second resilient member form a generally C-shaped connecting portion.

In accordance with another aspect of the present technology, there is provided a clip for selectively setting a position of a snowmobile ski with respect to a corresponding snowmobile ski leg, the ski leg being pivotably and slidably connected to the ski by a ski bolt. The clip includes a first leg having a first end, a second end and a first arcuate concave surface between the first and second ends; a second leg having a first end, a second end and a second arcuate concave surface between the first and second ends, the second arcuate concave surface facing the first arcuate concave surface; a intermediate portion connected to and extending between the second end of the first leg and the second end of the second leg, at least one of the first leg, the second leg, and the intermediate portion being resilient, the intermediate portion, the first leg and the second leg defining a channel, the channel being opened between the first ends of the first and second legs, the first and second arcuate concave surfaces being shaped for receiving the ski bolt therebetween, a distance between the first ends of the first and second legs being less than a diameter of the ski bolt; and a gripping portion connected to the intermediate portion.

In some implementations, the clip further includes a clip body extending from the intermediate portion; and the clip body defines an aperture for securing the clip to the ski.

In some implementations, the gripping portion and the aperture are disposed on opposite sides of the intermediate portion.

In some implementations, the intermediate portion includes a forward portion, a rearward portion separate from the forward portion, and a biasing member connected between the forward portion and the rearward portion, the biasing member biasing the first leg and the second leg toward each other.

In some implementations, the biasing member biases the first end of the first leg and the first end of the second leg into contact with each other; and the channel is opened between the first ends of the first and second legs when the first leg and the second leg are pulled apart against a biasing direction of the biasing member.

In accordance with yet another aspect of the present technology, there is provided a kit for adapting a snowmobile ski for adjustable positioning with respect to a corresponding snowmobile ski leg. The kit includes at least one clip according the implementation above; a template defining a bolt aperture, and a fastener aperture; and at least one fastener, the fastener aperture indicating a location to connect the at least one fastener to the ski when the ski bolt is passed through the bolt aperture of the template, the at least one clip being secured to the ski by the at least one fastener when the at least one fastener is connected to the ski.

In accordance with yet another aspect of the present technology, there is provided a snowmobile, including a frame; a motor connected to the frame; an endless track operatively connected to the motor and the frame; a straddle seat connected to the frame; two ski legs connected to the frame; two skis connected to the ski legs; and two clips according to the above, each of the two clips being selectively connected to a corresponding one of the two skis.

In some implementations, each clip is selectively connected to a corresponding one of the two skis in an interior position or an exterior position; in the interior position, each clip is disposed between the corresponding one of the two skis and an interior side of a corresponding one of the ski legs, in the exterior position, each clip is disposed between the corresponding one of the two skis and an exterior side of the corresponding ski leg; and a separation between the two skis is greater when the clips are connected in the interior position than when the clips are connected in the exterior position.

In accordance with yet another aspect of the present technology, there is provided a snowmobile ski assembly, including a ski; a ski bolt connected to the ski, the ski bolt being adapted for connecting to a ski leg of a snowmobile; and a clip according to the above selectively connected to the ski bolt.

In some implementations, the snowmobile ski assembly further includes a ski leg connected to the ski by the ski bolt, the ski leg being selectively slidable along the ski bolt between a first ski leg position and a second ski leg position; wherein the clip is selectively connected to the bolt in a first clip position or in a second clip position, in the first position, the ski leg is in the first ski leg position and the clip is disposed between the ski and a first side of the ski leg, and in the second position, the ski leg is in the second ski leg position and the clip is disposed between the ski and a second side of the ski leg, the second side of the ski leg being opposite the first side of the ski leg.

In accordance with yet another aspect of the present technology, there is provided a snowmobile including a frame; a motor connected to the frame; an endless track operatively connected to the motor and the frame; a straddle seat connected to the frame; two ski legs connected to the frame; two skis connected to the ski legs, each ski being laterally slidable relative to a corresponding one of the two ski legs; and two clips, each clip being selectively connected and disconnected from a corresponding one of the two skis without removal of the ski from the ski leg, each clip being selectively connected to the corresponding one of the two skis in an interior position or an exterior position; in the interior position, each clip being disposed between the corresponding one of the two skis and an interior side of a corresponding one of the ski legs, in the exterior position, each clip being disposed between the corresponding one of the two skis and an exterior side of the corresponding ski leg; and a separation between the two skis being greater when the clips are connected in the interior position than when the clips are connected in the exterior position.

In accordance with yet another aspect of the present technology, there is provided a snowmobile ski assembly including a ski; a ski bolt connected to the ski, the ski bolt being adapted for connecting to a ski leg of a snowmobile; a ski leg connected to the ski by the ski bolt, the ski leg being selectively slidable along the ski bolt between a first ski leg position and a second ski leg position; and a clip selectively connected to the ski bolt, the clip being selectively connected to the bolt in a first clip position or in a second clip position, in the first position, the ski leg being in the first ski leg position and the clip is disposed between the ski and a first side of the ski leg, in the second position, the ski leg being in the second ski leg position and the clip is disposed between the ski and a second side of the ski leg, the second side of the ski leg being opposite the first side of the ski leg.

In accordance with yet another aspect of the present technology, there is provided a method for adjusting a position of a snowmobile ski with respect to a corresponding snowmobile ski leg, the ski leg being pivotably and slidably connected to a ski bolt. The method includes removing a clip from the ski bolt, the clip having been disposed between a first side of the ski leg and a first side edge of the ski, the ski leg and the ski remaining connected via the ski bolt; sliding the ski laterally relative to the ski leg along the ski bolt such that the ski leg moves toward the first side edge of the ski; and connecting the clip to the ski bolt laterally between a second side of the ski leg and a second side edge of the ski, the second side of the ski leg being opposite the first side of the ski leg, and the second side edge of the ski being opposite the first side edge of the ski.

In some implementations, removing the clip from the ski bolt comprises pivoting the clip about a fastener connected to the ski and disposed through an aperture of the clip; the method further includes sliding the clip along the fastener after removing the clip from the ski bolt; and wherein the ski and the clip are slid in opposite directions.

In some implementations, the removing the clip from the ski bolt includes gripping, by a hand of a user of the snowmobile, a gripping portion of the clip; and pivoting, by the hand of the user, the gripping portion upward until the clip disengages from the ski bolt.

In accordance with yet another aspect of the present technology, there is provided a method of adjusting a ski stance of a snowmobile, the snowmobile having two ski legs and two skis, each ski leg being pivotably and slidably connected to a ski bolt of a corresponding one of the two skis. The method includes adjusting a position of each ski of the two skis, the adjusting the position including for each ski removing a clip from the ski bolt, the clip having been disposed between a first side of a corresponding one of the two ski legs and a first side edge of the ski, the ski leg and the ski remaining connected via the ski bolt; sliding the ski laterally relative to the corresponding ski leg along the ski bolt such that the corresponding ski leg moves toward the first side edge of the ski; and connecting the clip to the ski bolt laterally between a second side of the corresponding ski leg and a second side edge of the ski, the second side of the ski leg being opposite the first side of the ski leg, and the second side edge of the ski being opposite the first side edge of the ski, the two skis being slid in opposite directions.

In some implementations, the first side of each ski leg of the two ski legs is an interior side of each ski leg; and the ski stance widens.

In some implementations, the first side of each ski leg of the two ski legs is an exterior side of each ski leg; and the ski stance narrows.

For purposes of this application, terms related to spatial orientation such as forwardly, rearwardly, upwardly, downwardly, left, and right, are as they would normally be understood by a driver of the snowmobile sitting thereon in a normal driving position.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

Although the present technology is described below with respect to a snowmobile, it is contemplated that aspects could be applied to other vehicles having skis as ground engaging members.

Figure 1:
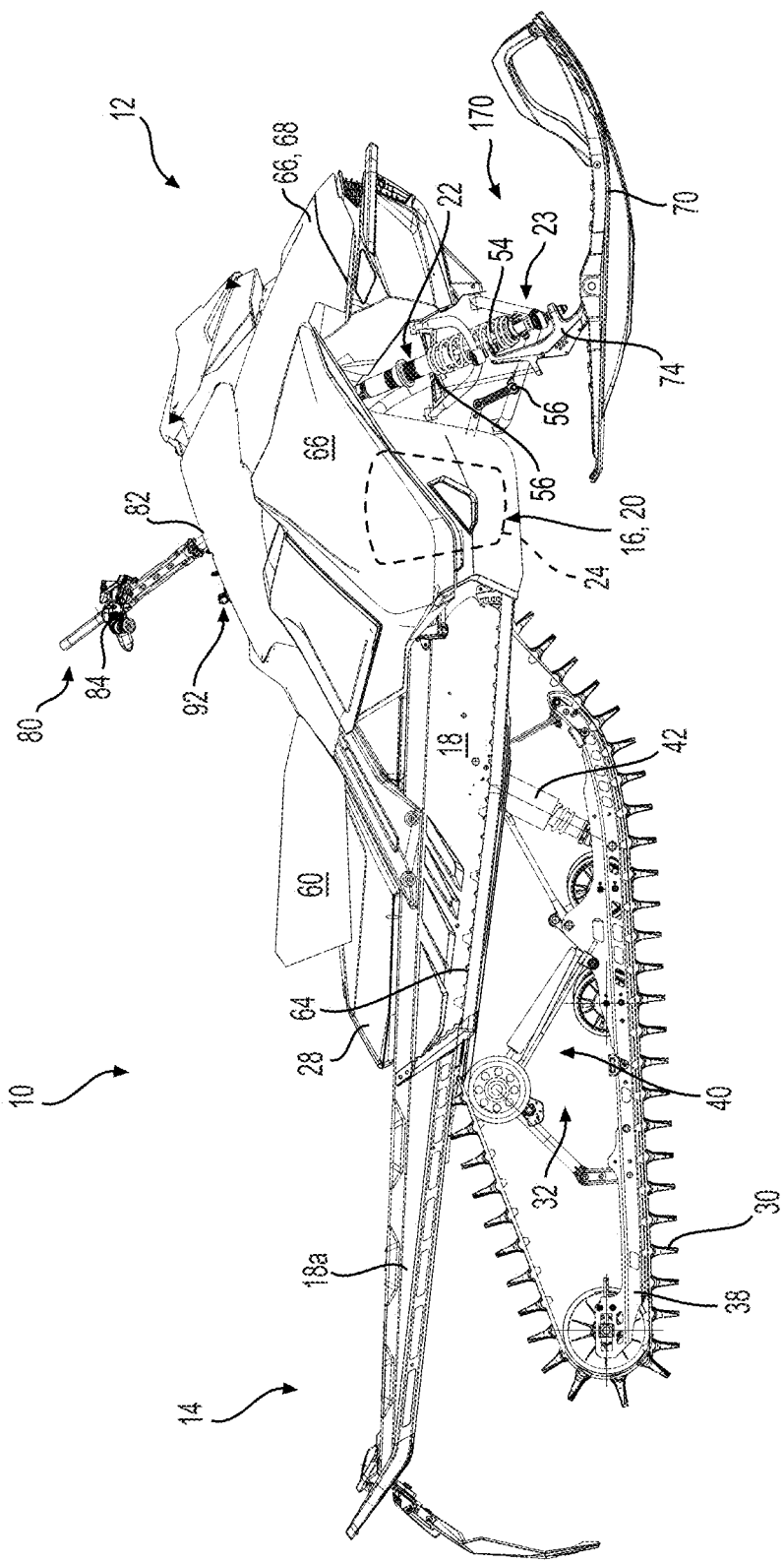
FIG. 1 is a right side elevation view of a snowmobile.
Figure 2:
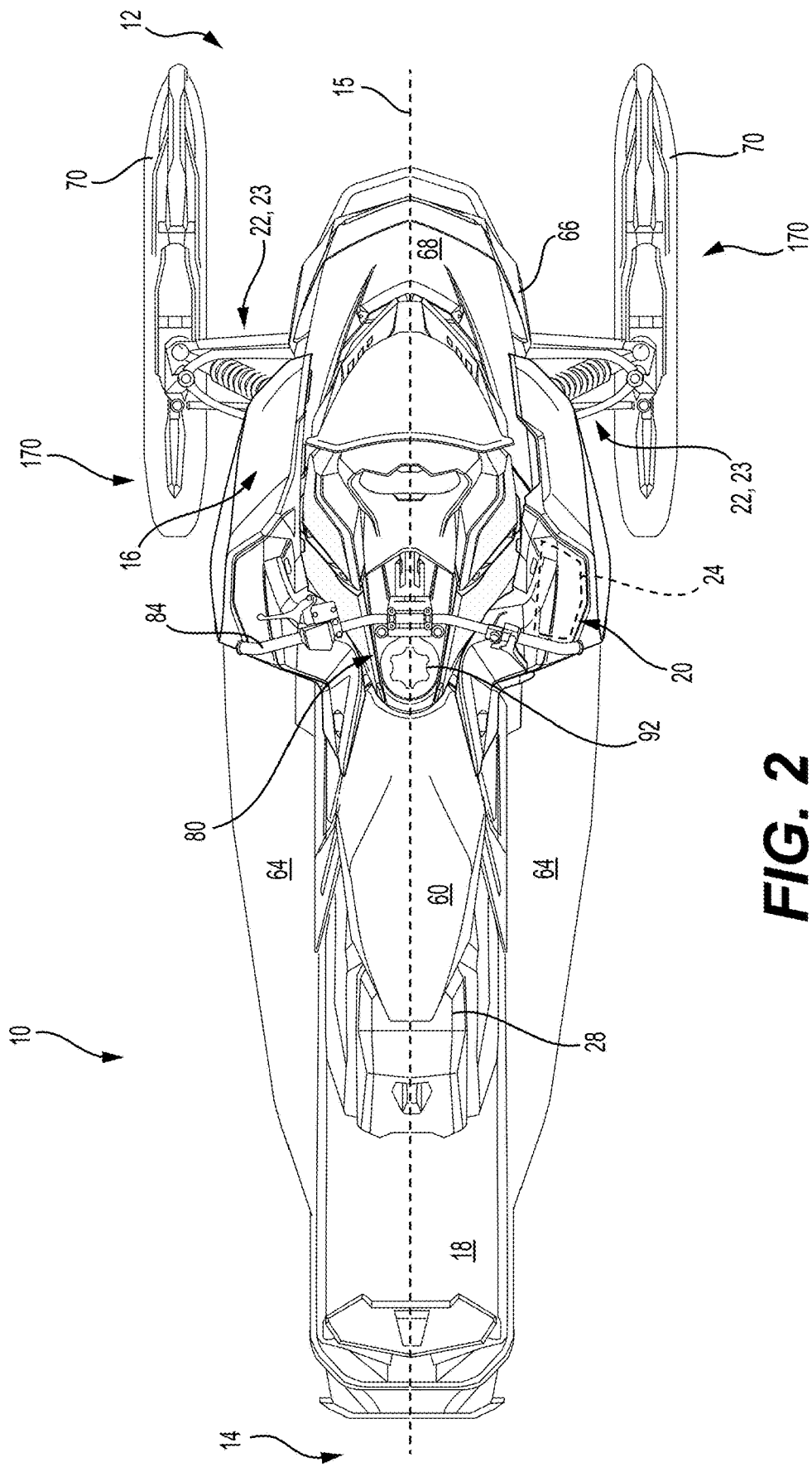
FIG. 2 is a top plan view of the snowmobile of FIG. 1.

With reference to FIGS. 1 and 2, a snowmobile 10 includes a front end 12 and a rear end 14 which are defined consistently with a travel direction of the vehicle 10. A centerline 15 of the snowmobile 10 extends longitudinally through a center of the snowmobile 10, as is illustrated in FIG. 2. The snowmobile 10 includes a vehicle body 16, in the form of a frame or chassis 16, which includes a rear tunnel 18, an engine module 20, and front suspension modules 22. The tunnel 18 is formed from sheet metal parts assembled to form an inverted U-shape when viewed from the front or rear end 12, 14. The inverted U-shaped tunnel 18 has a left side portion 18a and a right side portion 18a (only the right being shown).

A motor 24 (illustrated schematically) is carried in an engine compartment defined by the engine module 20 of the vehicle body 16 and provides, in part, propulsion of the snowmobile 10. In the illustrated implementation, the motor 24 is an internal combustion engine 24, but it is contemplated that it could be, for example, an electric motor or a hybrid. A fuel tank 28, supported above the tunnel 18, supplies fuel to the engine 24 for its operation. A fuel tank fill opening covered by a gas filler cap 92 is disposed on the upper surface of the snowmobile 10, rearward of a handlebar 84 of the snowmobile 10. It is contemplated that the fuel tank fill opening and gas filler cap 92 could be disposed elsewhere on the snowmobile 10.

An endless drive track 30 is positioned generally under the tunnel 18, and is operatively connected to the engine 24 via a drivetrain including a belt transmission system (not shown) but is well known in the art of snowmobiles. The endless drive track 30 is driven to run about a rear suspension assembly 32 connected to the vehicle body 16 for propulsion of the snowmobile 10.

The rear suspension assembly 32 includes a pair of slide rails 38 in sliding contact with the endless drive track 30. The slide rails 38 are attached to the tunnel 18 by front and rear suspension arms 40 and one or more shock absorbers 42. It is contemplated that the snowmobile 10 could be provided with a different implementation of a rear suspension assembly 32 than the one shown herein.

A straddle seat 60 is positioned atop the fuel tank 28. The seat 60 is adapted to accommodate a driver of the snowmobile 10. It is contemplated that the seat 60 could also be configured to accommodate one or more passengers. It is also contemplated that the snowmobile 10 could include an additional one or more seats for passengers. A footrest 64 is positioned on each side of the snowmobile 10 below the seat 60 to accommodate the driver's feet. Each of the left and right footrests 64 extends generally laterally outwardly from the corresponding left and right side portion of the tunnel 18. In the illustrated implementation, each side portion 18a of the tunnel 18 is bent laterally outwardly at its bottom edge to form the corresponding footrest 64. It is however contemplated that the footrest 64 could be formed separately from and mounted to the tunnel 18.

At the front end 12 of the snowmobile 10, cowls 66 (also referred to as fairings 66) enclose the engine 24, the transmission system and other components of the power pack such as the air intake system. The cowls 66 include a hood 68 which can be opened to allow access to the engine 24 and other internal components of the snowmobile 10 from the top and the front which may be required, for example, for inspection or maintenance of the engine 24 and/or the power pack. The engine 24 and the transmission system are disposed between right and left side cowls 66. The side cowls 66 are both removably connected to the vehicle body 16 and/or to other cowls (not separately labeled) and can be removed to access the internal components from the corresponding lateral side.

Two ski assemblies 170 are connected to the front end 12 of the snowmobile 10. Each ski assembly 170 is attached to the front suspension module 22 of the vehicle body via a front suspension assembly 23. Each front suspension assembly 23 includes a shock absorber 54, supporting arms 56 and ball joints 58 (see FIG. 5, for example). Each ski assembly 170 includes a ski 70 and a ski leg 74 connecting the ski 70 to the corresponding suspension module 22. The ski assemblies 170 will be described in more detail below.

A steering assembly 80, including the steering column 82 and a handlebar 84, is provided generally forward of the seat 60. The steering column 82 is rotatably connected to the vehicle body 16. The handlebar 84 is connected to the upper end of the steering column 82. The handlebar 84 is used to rotate the steering column 82, and thereby the skis 70, in order to steer the vehicle 10.

The snowmobile 10 includes other components such as a display cluster, an exhaust system, an air intake system, a snow flap, and the like. As it is believed that these components would be readily recognized, further explanation and description of these components will not be provided herein.

The ski assemblies 170, illustrated in greater detail in FIGS. 3 to 5, will now be described. As was mentioned above, each ski assembly 170 includes one ski leg 74 and one ski 70 connected to the ski leg 74. Each ski assembly 170 also includes a ski bolt 72. A lower portion of the ski leg 74 is pivotably connected to the ski bolt 72. The ski 70 pivots relative to the ski leg 74 about the ski bolt 72.

The lower portion of each ski leg 74 is also slidably connected to its corresponding ski bolt 72. When not impeded from moving laterally (described below), each ski 70 can be moved laterally (leftward or rightward) relative to its corresponding ski leg 74. As such, the skis 70 are adjustable between a narrow stance, where the skis 70 are closer together, and a wide stance, where the skis 70 are farther apart. To selectively set the lateral position of each ski 70 relative to its corresponding ski leg 74, each ski assembly 170 of the present technology includes a clip 100. The clip 100 is connected to the ski bolt 72 laterally between the lower portion of the ski leg 74 and one edge of the ski 70. The clip 100 serves generally as a spacer between the ski leg 74 and its corresponding ski 70, impeding lateral movement when the clip 100 is installed on the ski bolt 72 while pivoting motion of the ski 70 is generally unaffected.

Figure 3:
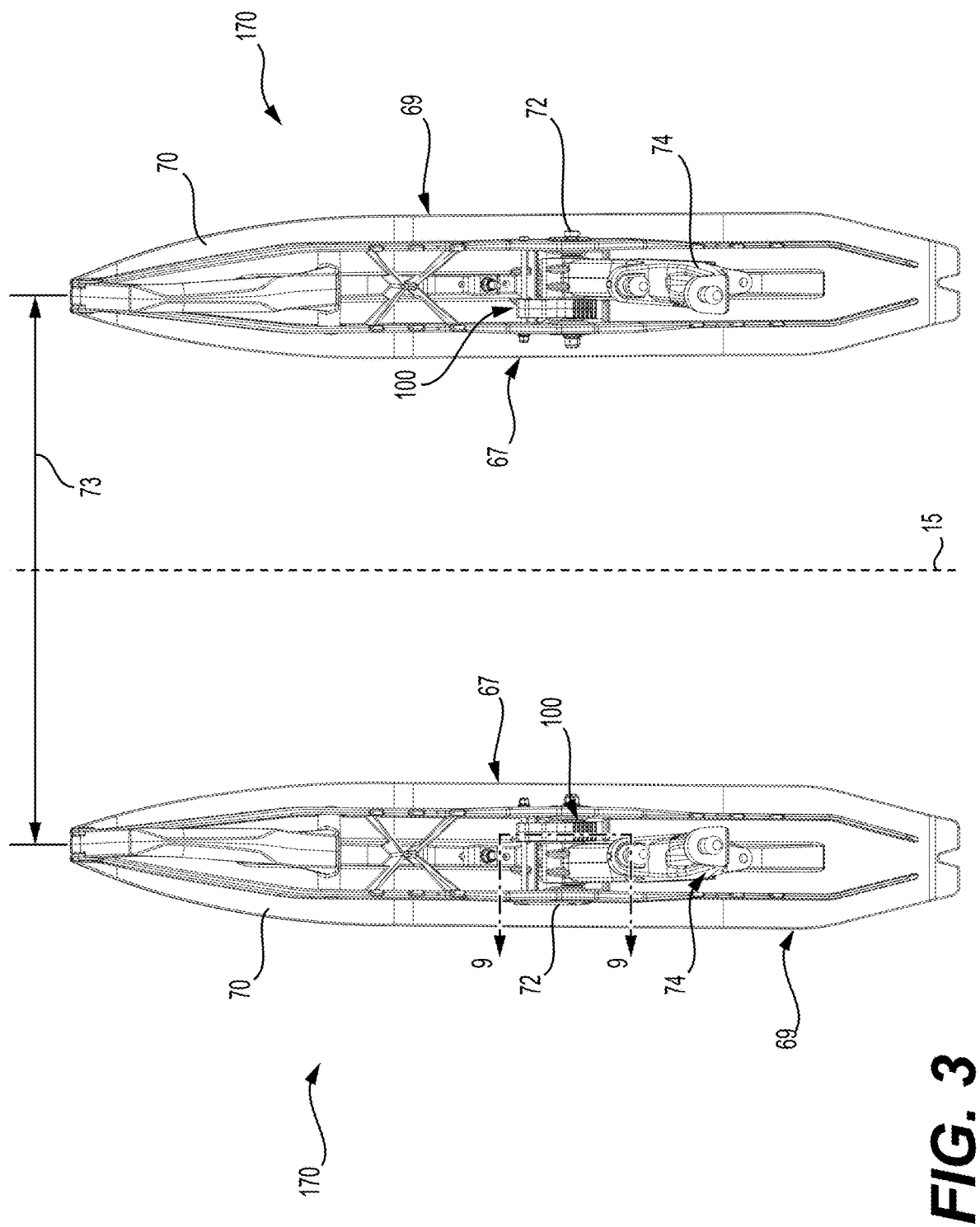
FIG. 3 is a top plan view of ski assemblies of the snowmobile of FIG. 1, with the skis arranged in a narrow stance.

In the narrow stance, illustrated in FIG. 3, the skis 70 are separated by a distance 73 which is set by the location at which the clips 100 are connected to the ski bolts 72. Specifically, in the narrow stance, the clip 100 of each assembly 170 is connected to the ski bolt 72 between an interior side of the corresponding ski leg 74 and an interior side edge 67 of the corresponding ski 70.

Figure 4:
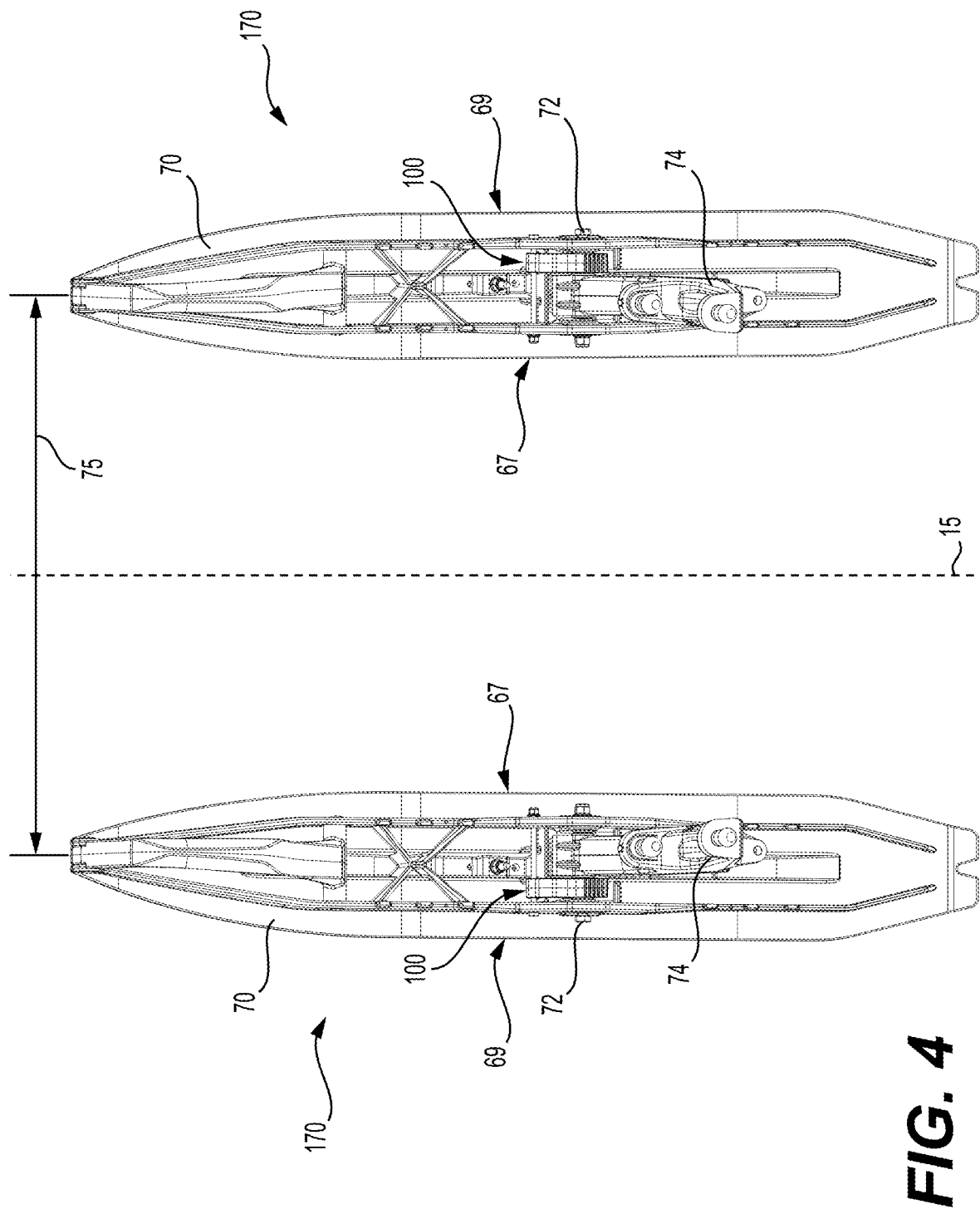
FIG. 4 is the top plan view of ski assemblies of FIG. 3, with the skis arranged in a wide stance.
Figure 5:
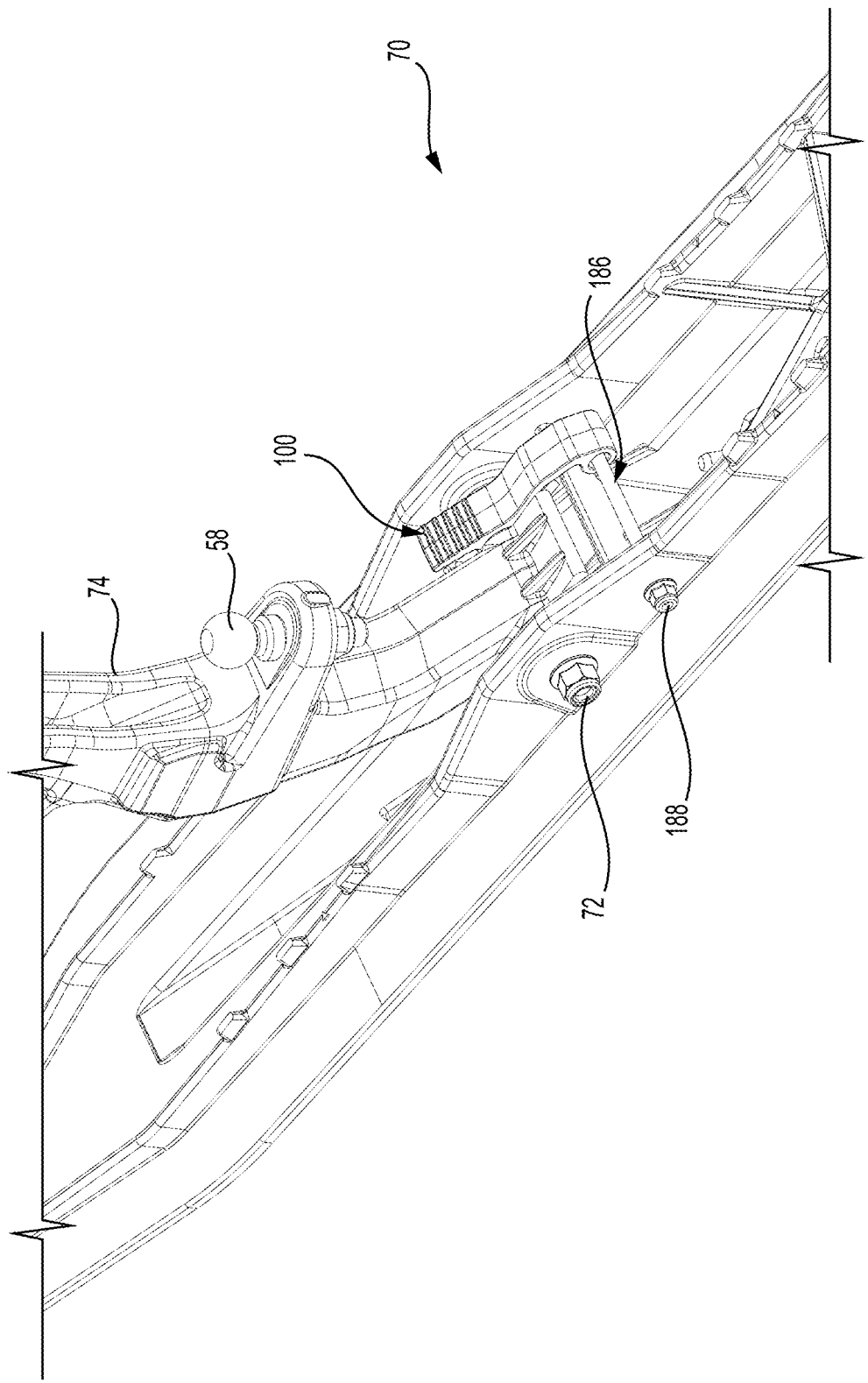
FIG. 5 is a top, front, right side, close-up, perspective view of a right ski assembly of the ski assemblies of FIG. 3, the right ski assembly being arranged in the wide stance position.
Figure 6:
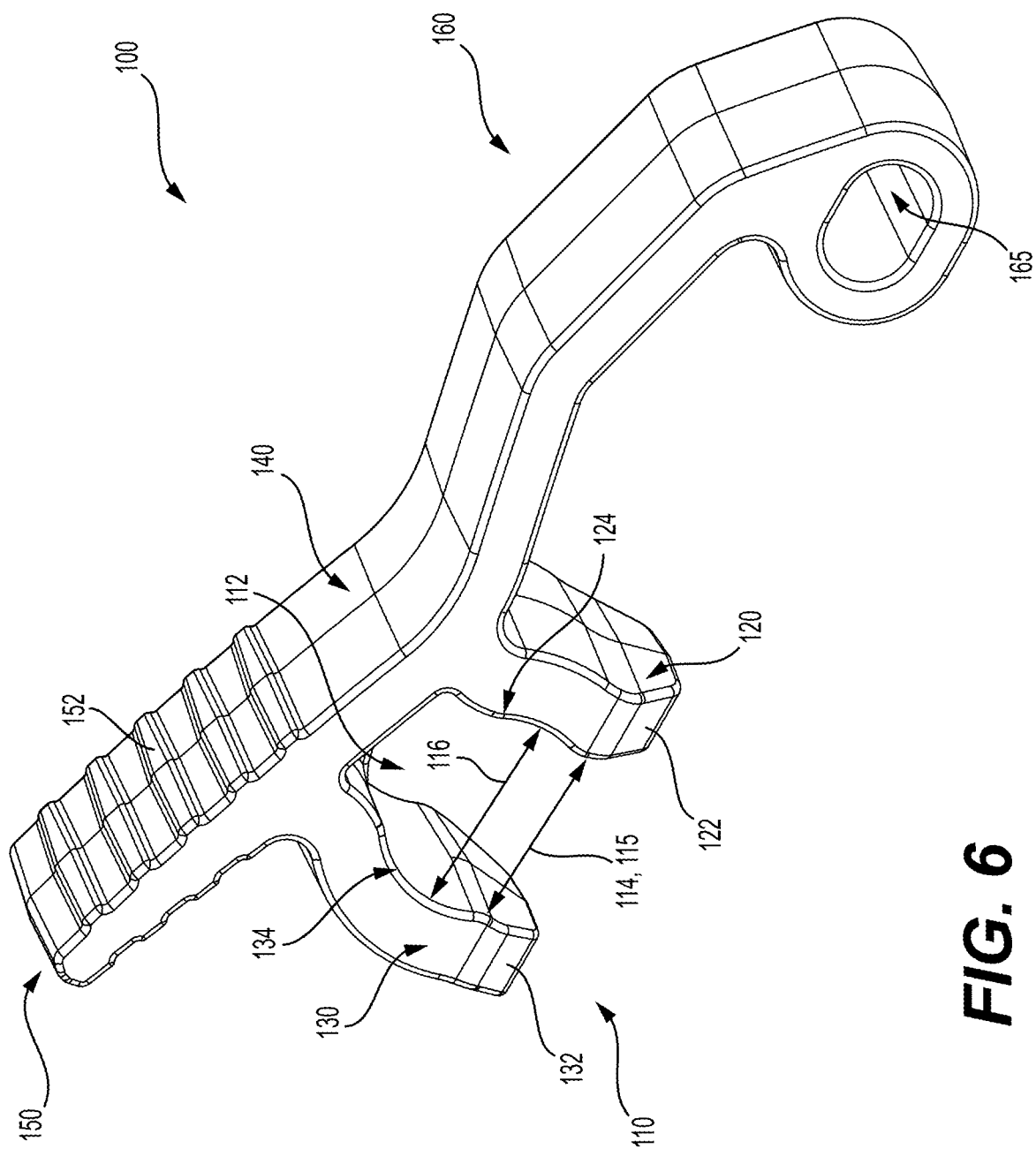
FIG. 6 is a top, front, right side perspective view of a clip of the right ski assembly of FIG. 5.

In the wide stance, illustrated in FIG. 4, the skis 70 are separated by a distance 75 which is similarly set by the location at which the clips 100 are connected to the ski bolts 72. The distance 75 is larger than the distance 73 by approximately twice the lateral width of the clip 100. In this case, the clip 100 of each assembly 170 is connected to the ski bolt 72 between an exterior side of the corresponding ski leg 74 and an exterior side edge 69 of the corresponding ski 70.

One implementation of the clip 100 will now be described in more detail with reference to FIGS. 6 to 10, where the clip 100 is illustrated in isolation and in cross-section. It is contemplated that different implementations of a clip which can be selectively connected and disconnected from the ski assembly 170 without separation of the ski 70 from the ski leg 74 could be used. Some possible implementations include clips using velcro and separable parts to be joined together around the ski bolt 72.

Only the clip 100 connected to the right ski assembly 170 is illustrated and described below, as the left assembly clip 100 is identical to the right assembly clip 100. It is contemplated that the left and right clips 100 may not be identical in some implementations.

The clip 100 is made from nylon, such that the clip 100 remains generally flexible even at cold temperatures. It is contemplated that the clip 100 could be made from a different material, including but not limited to: rubber and plastic. As will be described below with reference to another implementation, a separate biasing element could also be included, including for implementations where the clip 100 is made from a material that is not flexible or that is not flexible at cold temperatures. It is also contemplated that different portions of the clip 100 could be made from different materials connected together, depending on the implementation. For example, only selected portions of the clip 100 could be formed from nylon, such that those portions remain flexible at cold temperatures but remaining portions may not.

The clip 100 includes a connecting portion 110 for selectively connecting the clip 100 to the ski bolt 72. The connecting portion 110 defines a space 112, also referred to as a channel 112, for receiving the ski bolt 72 therein. The space 112 will be described in more detail below.

The connecting portion 110 is formed by three resilient members: a forward leg 120, rearward leg 130, and an intermediate portion 140. It is contemplated that the connecting portion 110 could be differently formed in some implementations, for example by including additional legs.

The forward leg 120 is connected to the intermediate portion 140 at a top end (not separately numbered). The forward leg 120 extends generally downward from the top end toward a bottom end 122. Between the top end and the bottom end 122, the leg 120 includes an arcuate concave surface 124. The surface 124 partially defines the space 112, as will be described below. A portion of the arcuate surface 124 has a radius of curvature matching that of the ski bolt 72, but this may not be the case in all implementations.

Similarly, the rearward leg 130 is connected to the intermediate portion 140 at a top end (not separately numbered). The rearward leg 130 extends generally downward from the top end toward a bottom end 132. Between the top end and the bottom end 132, the leg 130 includes an arcuate concave surface 134 disposed generally opposite the surface 124 of the forward leg 120. The surface 134 also partially defines the space 112. A portion of the arcuate surface 124 has a radius of curvature matching that of the ski bolt 72, but this may not be the case in all implementations.

The forward leg 120, rearward leg 130, and intermediate portion 140 form a generally C-shaped connecting portion 110. As all of the forward leg 120, rearward leg 130, and intermediate portion 140 are formed from nylon in the present implementation, all three 120, 130, 140 are resilient and flex when connecting to or disengaging from the ski bolt 72, as described in more detail below. It is contemplated that only one or two of the members 120, 130, 140 may be resilient in some implementations.

Within the C-shape is defined the space 112, within which the ski bolt 72 is received when the clip 100 is connected thereto. The space 112 has an opening 114 on a bottom side of the clip 100. The opening 114 has an opening span 115 which is less than a diameter 172 of the ski bolt 72 (see FIG. 10). The opening span 115 is defined by a minimum distance between the bottom end 122 of the forward leg 120 and the bottom end 132 of the rearward leg 130 when the ski bolt 72 is not received in the space 112.

The space 112 also has a central span 116 which is greater than the opening span 115, defined in part by the arcuate surfaces 124, 134. As such, when the ski bolt 72 is received in the space 112, the ski bolt 72 fits within the space 112 and is held in place by the lower portions of the legs 120, 130.

The clip 100 further includes a gripping portion 150. The gripping portion 150 extends generally upward and rearward from the connecting portion 110. The gripping portion 150 includes a plurality of ridges 152 to provide a grippable surface for a hand of the rider to manipulate the gripping portion 150. It is contemplated that the gripping portion 150 may be of a different form than that illustrated in the present Figures. For example, the gripping portion 150 could be handle-shaped, or may include more or fewer ridges 152.

The clip 100 is selectively connected to and removed from the ski bolt 72 as follows. To connect the clip 100, the opening 114 is aligned with the ski bolt 72, with the clip 100 being placed generally on top of the ski bolt 72. The connecting portion 110 is then pushed generally downward, either by holding the gripping portion 150, or by pushing on the intermediate portion 140, or both. At least one of the resilient members 120, 130, 140 of the connecting portion 110 then deflects under the pressure of being pushed onto the ski bolt 72. This causes the opening 114 to expand sufficiently to allow the ski bolt 72 into the space 112. Once the ski bolt 72 is received in the space 112, the opening 114 generally returns to its size at rest and the connecting portion 110 is engaged around the ski bolt 72. See, for example, FIGS. 9 and 10. In some arrangements, the opening 114 may remain slightly extended. To remove or disengage the clip 100 from the ski bolt 72, the gripping portion 150 is pulled generally upward and forward. The connecting portion 110 deforms such that the opening 114 can expand around the ski bolt 72, until the ski bolt 72 is released from the space 112 and the clip 100 is disengaged from the ski bolt 72.

Figure 7:
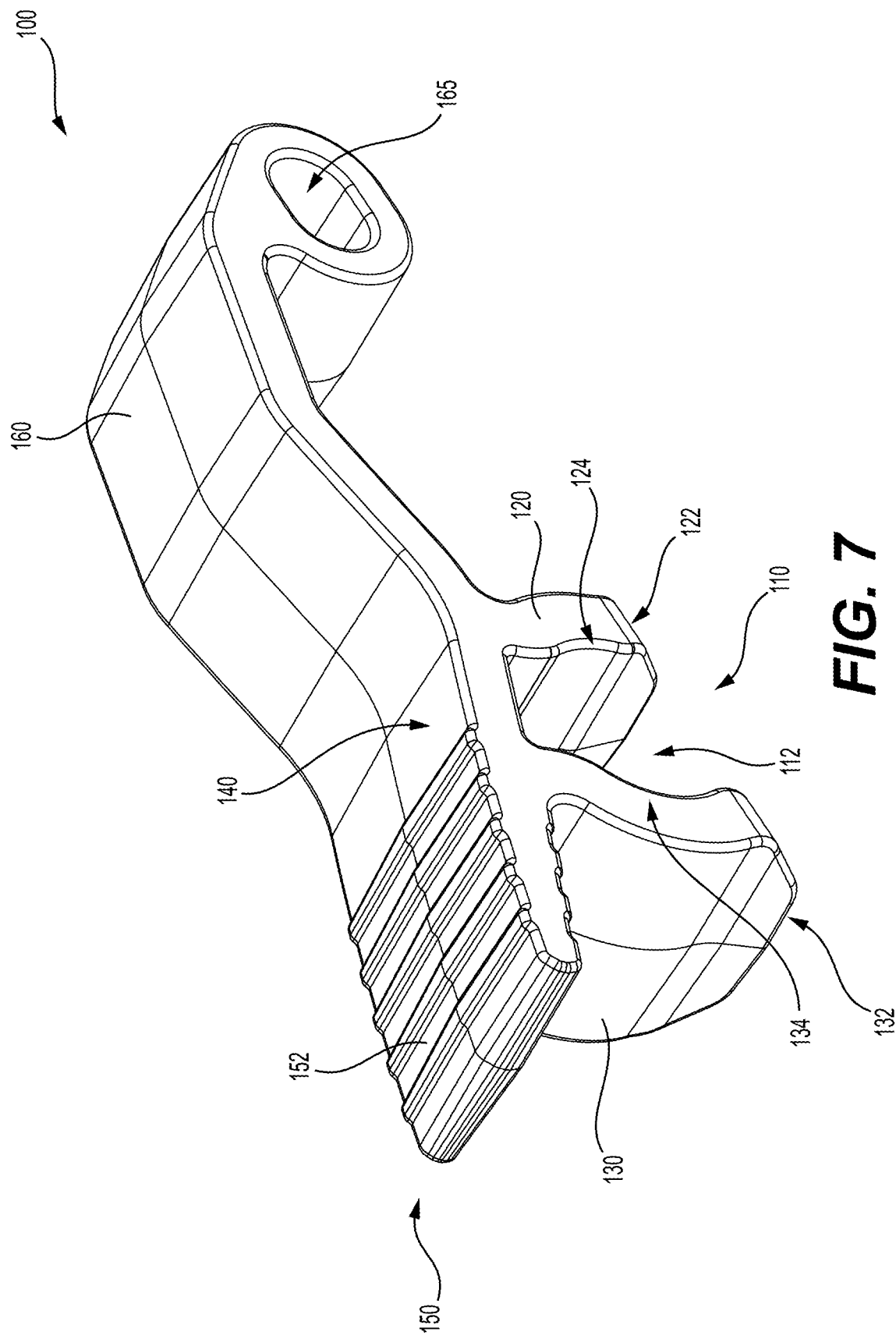
FIG. 7 is a top, rear, right side perspective view of the clip of FIG. 6.
Figure 8:
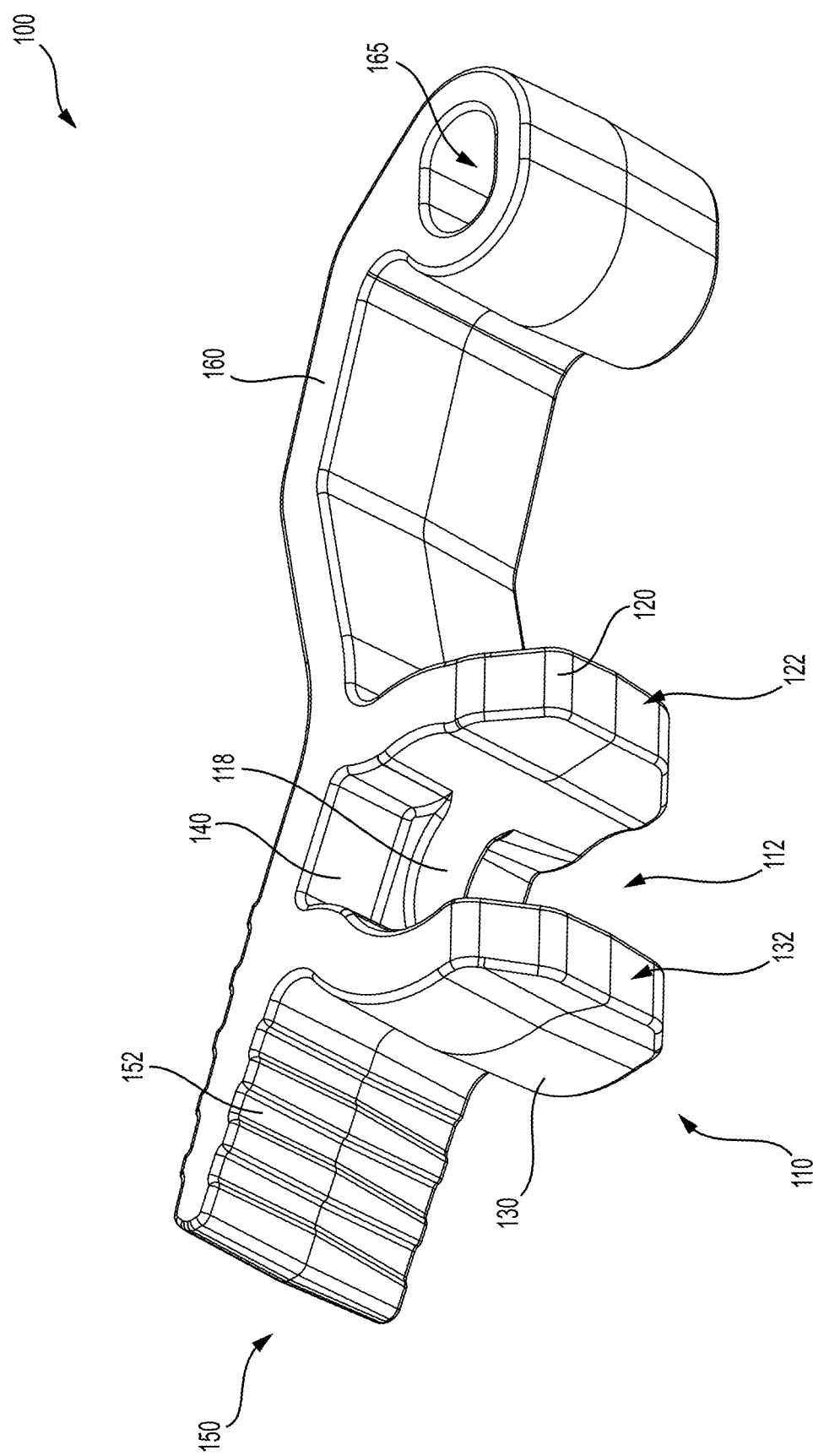
FIG. 8 is a bottom, rear, right side perspective view of the clip of FIG. 6.
Figure 9:
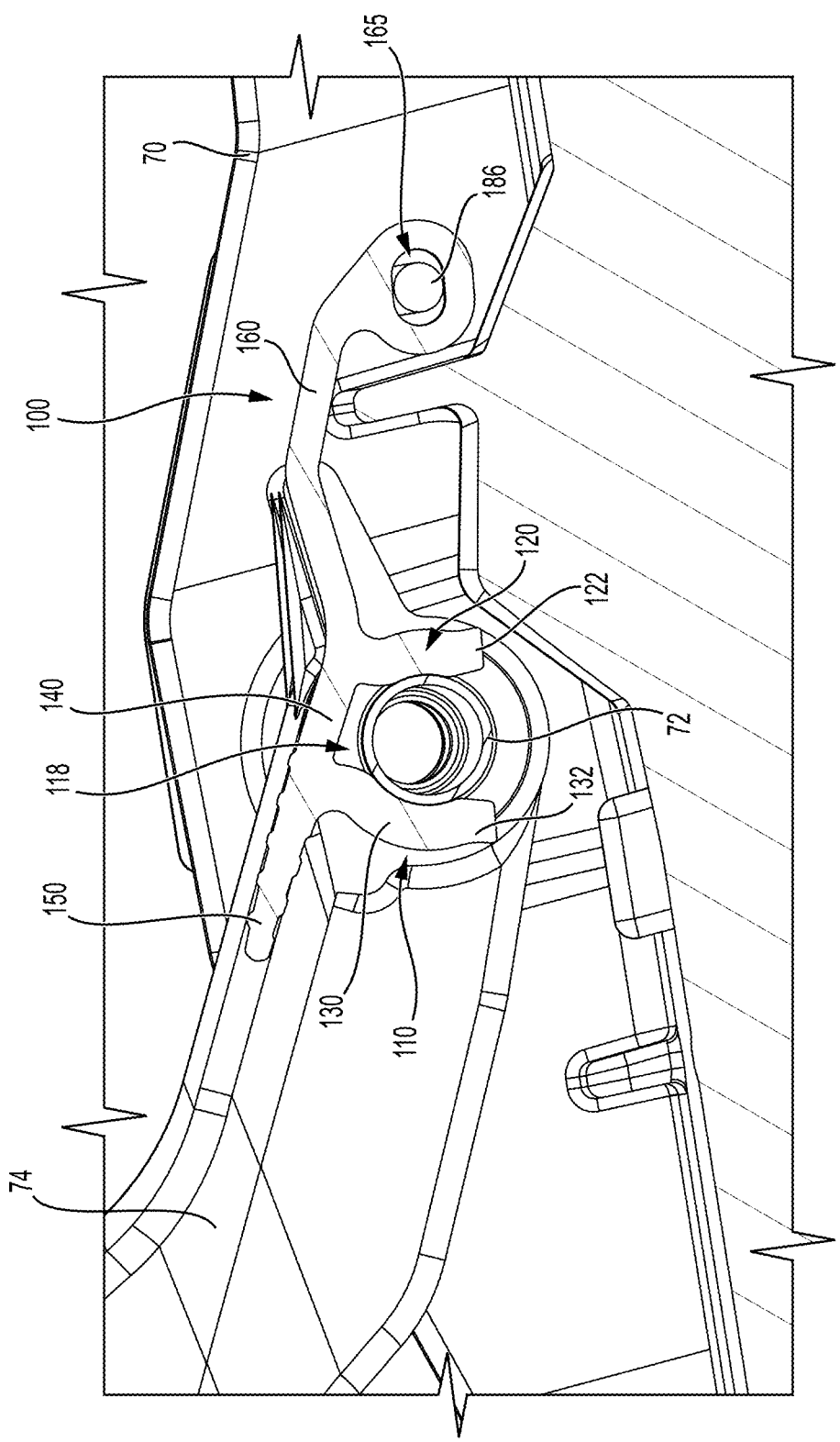
FIG. 9 is a cross-sectional view of the clip and a ski of the right ski assembly of FIG. 3, taken along line 9-9 of FIG. 3.
Figure 10:
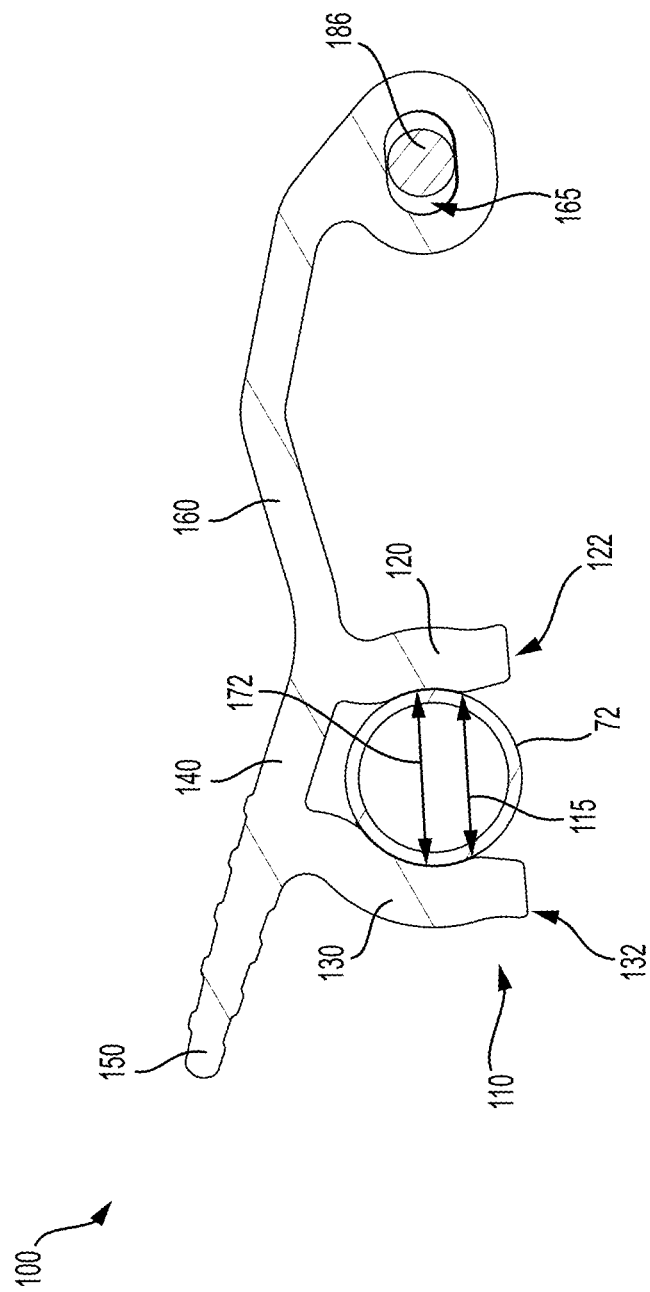
FIG. 10 is the cross-sectional view of the clip, a ski bolt, and a fastener of right ski assembly of FIG. 9, shown in isolation.

The forward leg 120 and the rearward leg 130 are shaped to generally aid in selectively connecting the connecting portion 110 to the ski bolt 72. The bottom ends 122, 132 of the legs 120, 130 are chamfered, as can be seen in FIGS. 7 and 8. The chamfered ends 122, 132 aid in directing snow away from the clip 100 and the space 112 when the connecting portion 110 is pushed onto the ski bolt 72. In some implementations, only one or none of the legs 120, 130 may be chamfered. A portion of the bottom ends 122, 132 of the legs 120, 130 are also flared outward away from the space 112. The flared ends 122, 132 aid in aligning the space 112 with ski bolt 72, such that the ski bolt 72 pushes into the space 112, rather than slipping forward or rearward of the space 112. Similarly, in some implementations only one or none of the legs 120, 130 may be flared.

The connecting portion 110 also includes a rib 118 which extends from the forward leg 120 to the rearward leg 130. The rib 118 extends along an underside of the intermediate portion 140, on a side of the space 112 opposite the opening 114. The rib 118 also has a radius of curvature that generally matches an exterior of the ski bolt 72. The rib 118 is laterally narrower than the space 112, such that snow on the ski bolt 72 within the space 112 will be separated into two portions and may escape out along sides of the rib 118 when installing the clip 100 on the ski bolt 72 so that proper installation of the clip 100 onto the ski bolt 72 will generally not be prevented by the possible compacting of the snow therebetween.

The clip 100 further includes a clip body 160 extending forward from the connecting portion 110. The clip body 160 defines an aperture 165 for securing the clip 100 to the ski 70, even when the connecting portion 110 is selectively disengaged from the ski bolt 72. The aperture 165 is an oblong aperture 165. It is contemplated that the aperture 165 could be differently shaped depending on the implementation. For example, it is contemplated that the aperture 165 could be round, or in the form of the slot extending through the clip body 160. The aperture 165 and the gripping portion 150 are disposed on opposite sides of the connecting portion 110, but this could be different depending on the specific implementation.

The ski 70 includes a bolt 186 and nut 188 connected to the bolt 186 for securing the clip 100 to the ski 70. The bolt 186 is received through the aperture 165, and the clip 100 is pivotable about the bolt 186. The bolt and nut 186, 188 are connected to the ski 70 forward of the ski leg 74, but it is contemplated that that the bolt and nut 186, 188 could be connected rearward of the ski leg 74 (with the aperture 165 also being arranged to be rearward of the connecting portion 110). It is contemplated that a different fastener could be used in place of the bolt 186, including for example a pin. It is also contemplated that the aperture 165 could be used to connect the clip 100 to the ski 70 through different means than a fastener. For example, a chain or cord could be received through the aperture 165, and be connected to the ski 70 at an opposite end.

Figure 11:
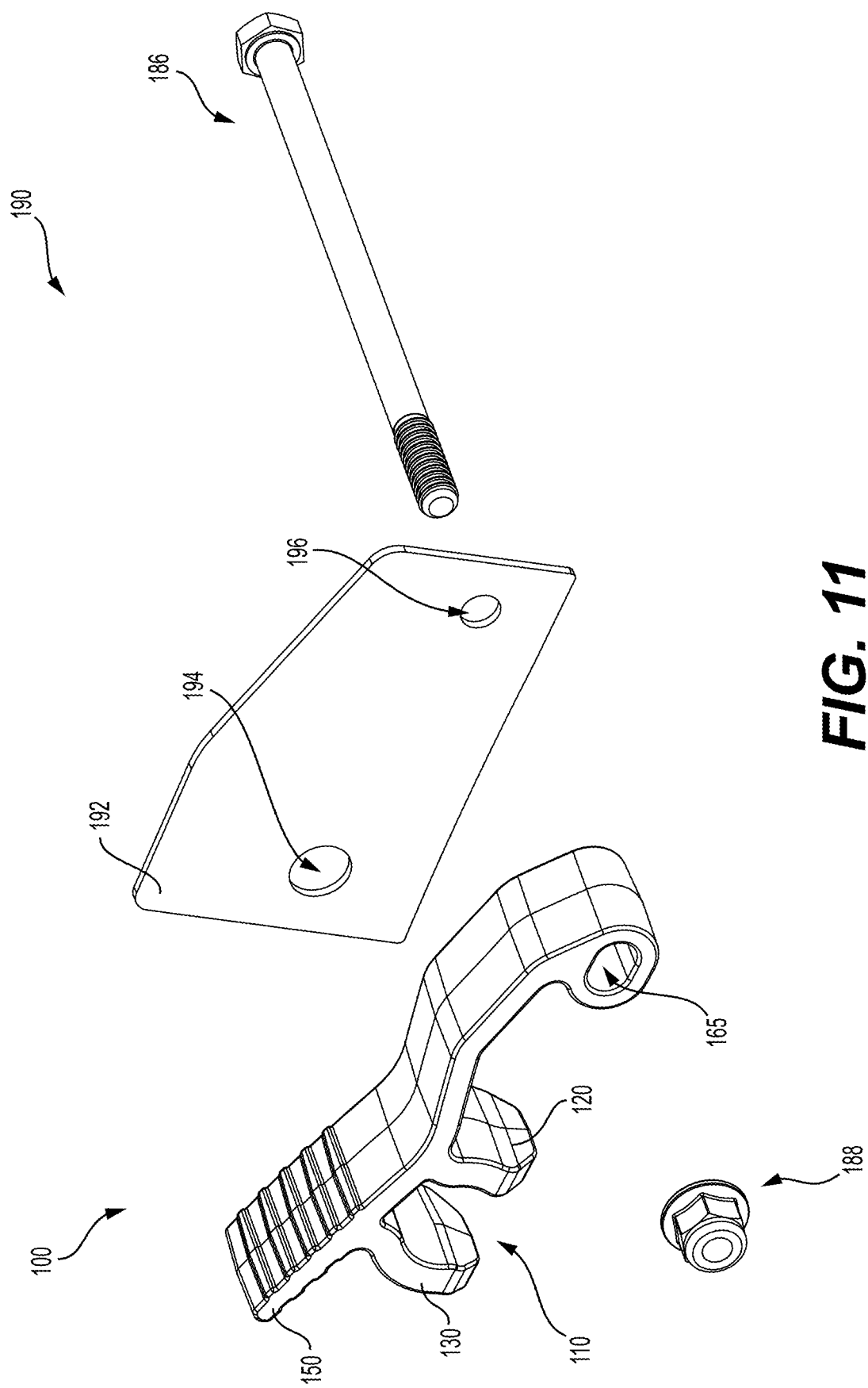
FIG. 11 is a top, front, right side perspective view of a kit for installing the clip of FIG. 6 on the ski of the ski assembly of FIG. 5.
Figure 12:
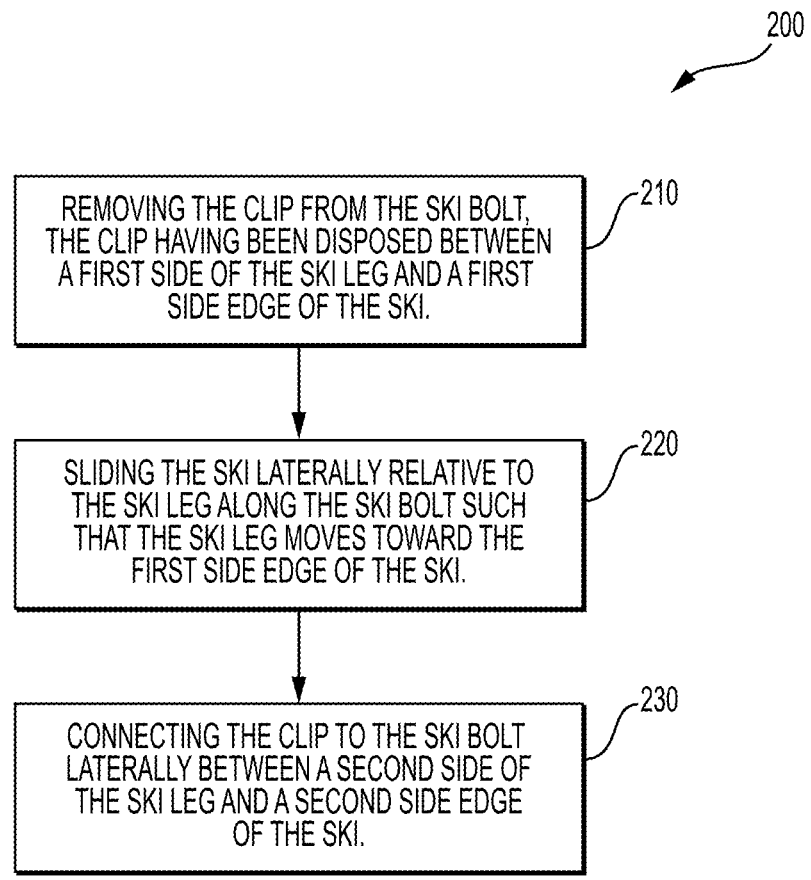
FIG. 12 is a flow chart of a method for adjusting a position of the ski of FIG. 5.

In some cases, the clips 100 could be provided as part of a retrofit kit 190, to allow the rider to add the clips 100 to a snowmobile that was not previously provided with the clips 100, or that were provided with a different clip implementation. One non-limiting implementation of the kit 190 is illustrated in FIG. 11.

The kit 190 includes the clip 100, the bolt 186, and the nut 188 described above. It is contemplated that the kit 190 could be provided without the bolt 186 and/or the nut 188. It is also contemplated that the kit 190 could include a different fastener in place of the bolt 186.

The kit 190 also includes a template 192 for installing the bolt 186 and the clip 100 on a version of the ski 70 where the bolt 186 has not yet been installed. The template 192 is made from hardened plastic, but it is contemplated that the template 192 could be made from any number of materials, including but not limited to: metal and wood.

The template 192 defines a bolt aperture 194 and a fastener aperture 196. The two apertures 194, 196 are arranged such that the fastener aperture 196 indicates a location to connect the bolt 186 to the ski 70 when the ski bolt 72 is passed through the bolt aperture 194.

To install the bolt 186, the template 192 is used as follows. First, the template 192 is installed on the ski 70 by: removing the ski bolt 72 from the ski 70, inserting the ski bolt 72 through the bolt aperture 194, and then reconnecting the ski bolt 72. With the template 192 installed on the ski 70, the location where the bolt 186 should be connected to the ski 70 is indicated by the fastener aperture 196. The location is then drilled through the fastener aperture 196, or marked to be later drilled. Once a through-hole of appropriate size is drilled, the bolt 186 and the clip 100 are installed on the ski 70, the bolt 186 passing through the aperture 165 of the clip 100 as described above. The oblong form of the aperture 165 provides some tolerance for placement of the bolt 186 with respect to the ski bolt 72.

It is contemplated that the template 192 could be designed to be used with a different fastener, depending on the implementation. It is also contemplated that the bolt aperture 194 could be replaced by a slot in the template 192.

As described above, the clips 100 allow the rider to selectively set the relative lateral position between the ski 70 and the ski leg 74, without the use of tools and without disconnecting the skis 70 from the ski legs 74. With reference to FIGS. 12 to 15, a method 200 of adjusting the relative position between the ski 70 and the ski leg 74, using the clips 100, will now be described.

The method 200 begins at step 210, with removing the clip 100 from the ski bolt 72, the clip 100 having been disposed between a first side of the ski leg 74 and a first side edge of the ski 70. In the example illustrated in FIGS. 13 to 15, the clip 100 was connected to the right ski bolt 72 between the left, interior side of the right ski leg 74 and the left, interior edge 67 of the right ski 70. The ski leg 74 is disposed nearer to the right, exterior edge 69 of the ski 70.

To remove the clip 100 from the ski bolt 72, a hand of the rider grips the gripping portion 150 of the clip 100. The hand then pivots the gripping portion 150 generally upward and forward until the clip 100 disengages from the ski bolt 72. As the clip 100 is pivoted upward about the bolt 186, the connecting portion 110 deforms slightly to allow the opening 114 to pass around the diameter 172 of the ski bolt 72. It should be noted that the clip 100 is removed from the ski bolt 72 without necessitating the removal or disassembly of the remaining portions of the ski assembly 170. The ski leg 74 and the ski 70 remain connected via the ski bolt 72.

Figure 14:
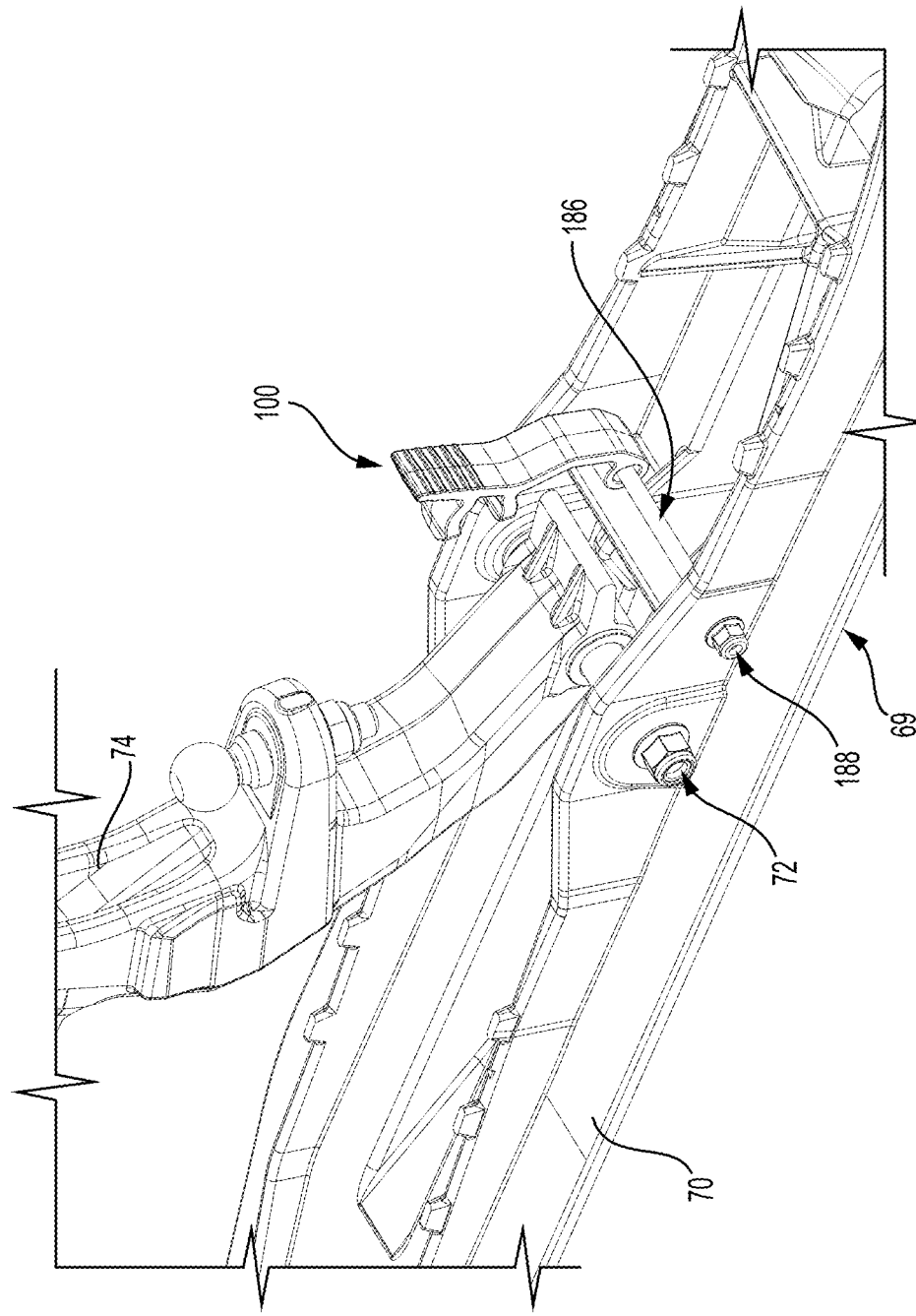
FIG. 14 is a top, front, right side, close-up, perspective view of the right ski assembly of FIG. 13, with the ski having been moved relative to the ski leg.

The method 200 continues at step 220, with sliding the ski 70 laterally relative to the ski leg 74 along the ski bolt 72 such that the ski leg 74 moves toward the first side edge of the ski 70. Lateral movement of the ski 70 is generally accomplished by pushing or kicking the ski 70 in the desired direction of displacement. In some implementations, the rider can first tilt the snowmobile 10 slightly, to take weight off of the ski 70, and then simply slide the ski 70 into its desired location. As is illustrated in FIG. 14, in the present example the ski 70 is slid rightward, such that the ski leg 74 is now nearer the left, interior side edge 67 than before.

Figure 15:
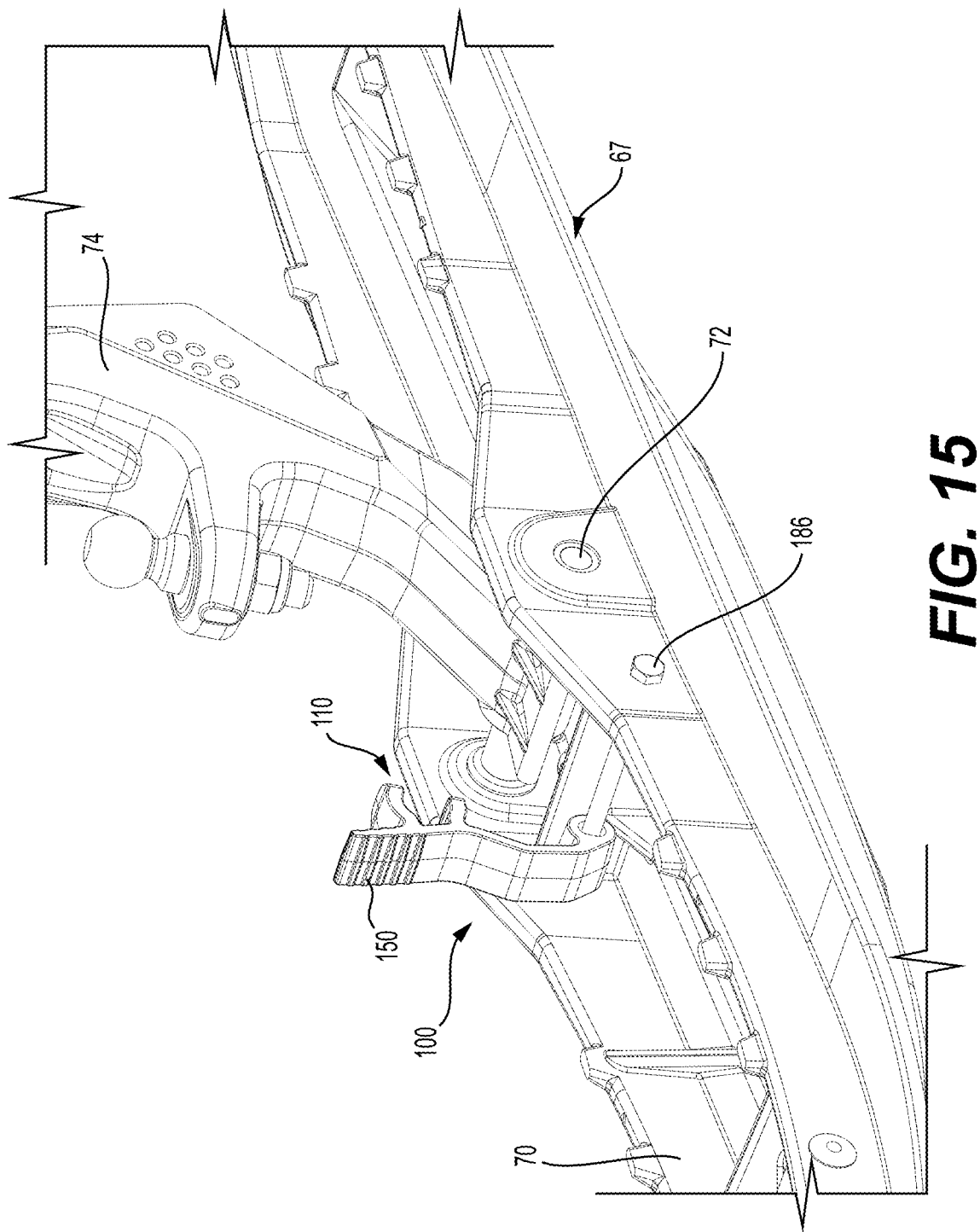
FIG. 15 is a top, front, left side, close-up, perspective view of the right ski assembly of FIG. 13, with the clip having been moved to an opposite side of the ski.

After having removed the clip 100 from the ski bolt 72, the clip 100 is then slid along the bolt 186 to the opposite side of the ski 70. As is illustrated in FIG. 15, the right clip 100 is slid toward the right side of the right ski 70.

As can be seen in the Figures, the ski 70 and the clip 100 have been slid in opposite directions. It is contemplated that order of moving the clip 100 and then moving the ski 70 could be reversed. In implementations where the clip 100 is not connected to the ski 70 by the bolt 186 (some such implementations being described below), the clip 100 could simply be set aside during repositioning of the ski 70.

Figure 13:
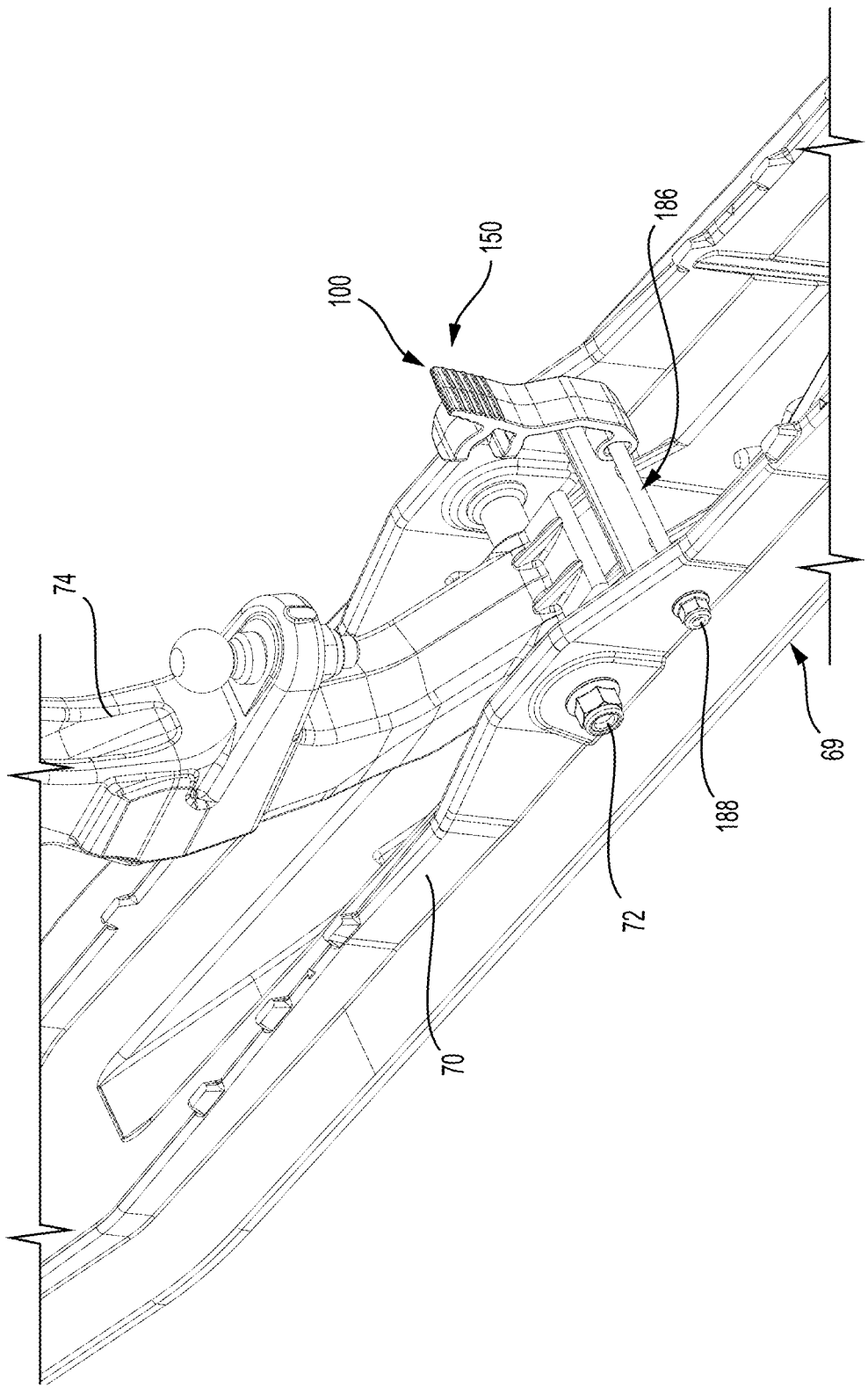
FIG. 13 is a top, front, right side, close-up, perspective view of the right ski assembly of FIG. 5, with the clip having been removed from the ski bolt.

The method 200 then terminates at step 230, with connecting the clip 100 to the ski bolt 72 laterally between a second side of the ski leg 74 and a second side edge of the ski 70. The rider pushes, using a hand, the connecting portion 110 down over the ski bolt 72, but it is contemplated that the rider could use a boot to push down on the clip 100 to connect the clip 100 to the ski bolt 72. In the example of FIGS. 13 to 15, the clip 100 is reconnected to the ski bolt 72 (not explicitly illustrated) between the left side of the ski leg 74 and the left, interior edge 67 of the ski 70.

Figure 16:
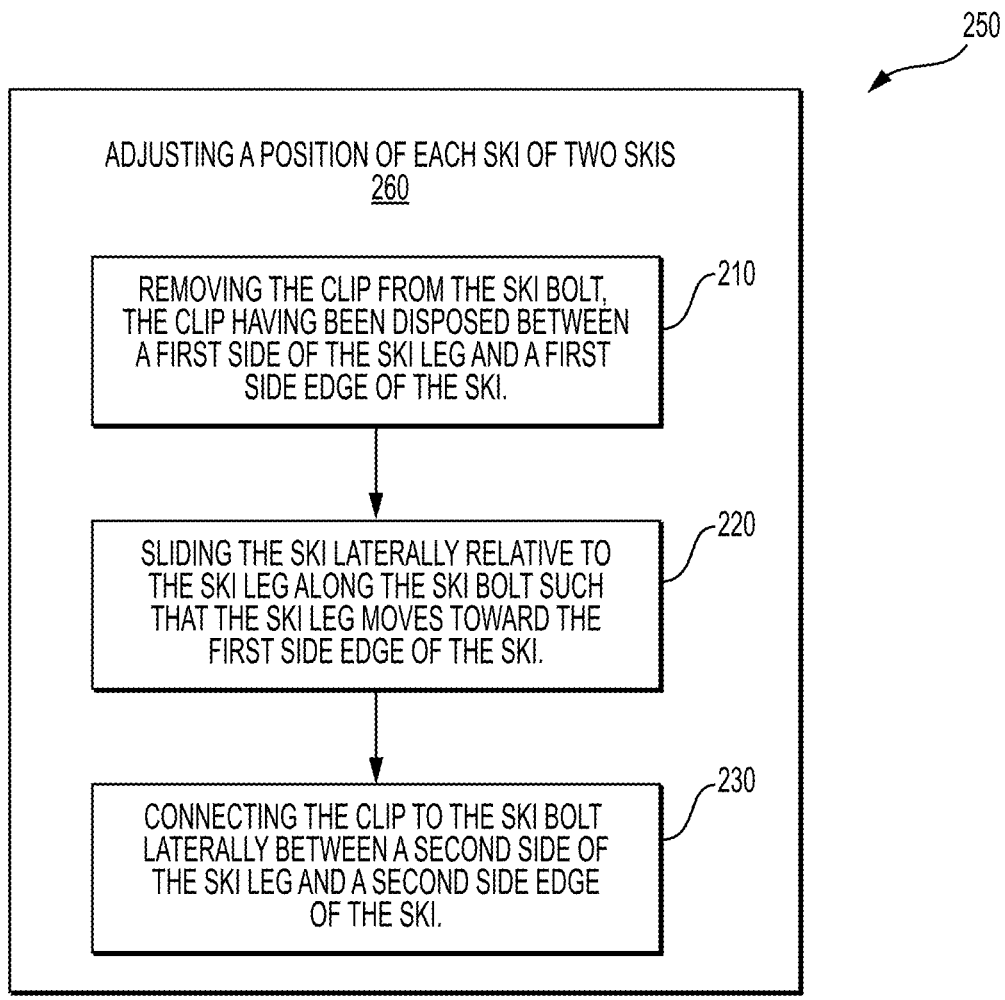
FIG. 16 is a flow chart of a method for adjusting a ski stance of the snowmobile of FIG. 1.

When the rider encounters different terrain conditions and desires to change from one stance to another, the rider can apply a method 250 of adjusting the ski stance of the snowmobile 10. For example, the rider can apply the method 250 changing from riding on a groomed trail (the wide stance as illustrated in FIG. 4) to maneuvering in deep, loose snow (the narrow stance as illustrated in FIG. 3), or vice versa. The method 250 of will now be described with reference to FIG. 16.

The method 250 of adjusting the ski stance of the snowmobile 10 begins at step 260, with adjusting the position of each ski 70 of the two skis 70. The adjusting the position of each ski 70 is carried out according to method 200 described above.

Specifically, for a first one of the skis 70, the method 250 continues at step 210 with removing the clip 100 from the ski bolt 72, the ski leg 74 and the ski 70 remaining connected via the ski bolt 72. Then the method 250 continues at step 220 with sliding the ski 70 laterally relative to the corresponding ski leg 74 along the ski bolt 72 toward the centerline 15. The method 250 continues at step 230 with connecting the clip 100 to the ski bolt 72 laterally between a second side of the corresponding ski leg 74 and a second side edge of the ski 70.

The method 250 then continues with steps 210, 220, and 230 for the remaining ski 70, with the two skis 70 being slid in opposite directions. It is not necessary to complete steps 210, 220, 230 for one ski 70 before carrying out the steps 210, 220, 230 for the remaining ski 70. In implementations where the skis 70 begin in a narrow stance, as is illustrated in FIG. 3, performing the method 250 widens the ski stance. In implementations where the skis 70 begin in the wide stance, as is illustrated in FIG. 4, performing the method 250 narrows the ski stance.

It is contemplated that the method 250 could include carrying out step 210 with removing the clip 100 from the ski bolt 72 for each of the skis 70, before continuing on to step 220 for either ski, for example. It is also contemplated that the remaining steps could be carried out for each ski 70 first before performing the following step. It is further contemplated that the method 250 could include additional or different steps, either to perform additional functions and/or to perform the steps described above.

Figure 17:
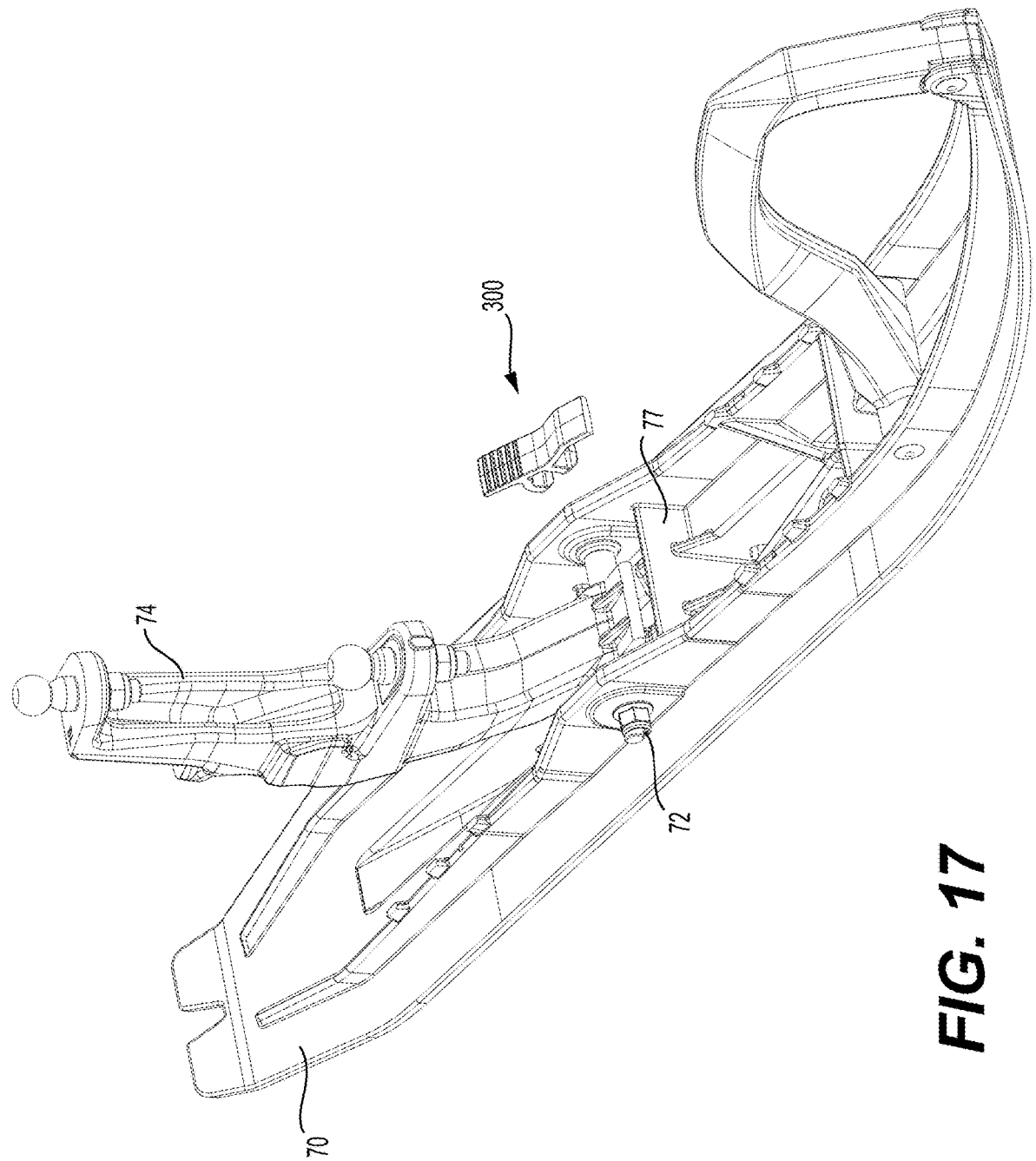
FIG. 17 is a top, front, right side perspective view of another implementation of a right ski assembly according to the present technology.
Figure 18:
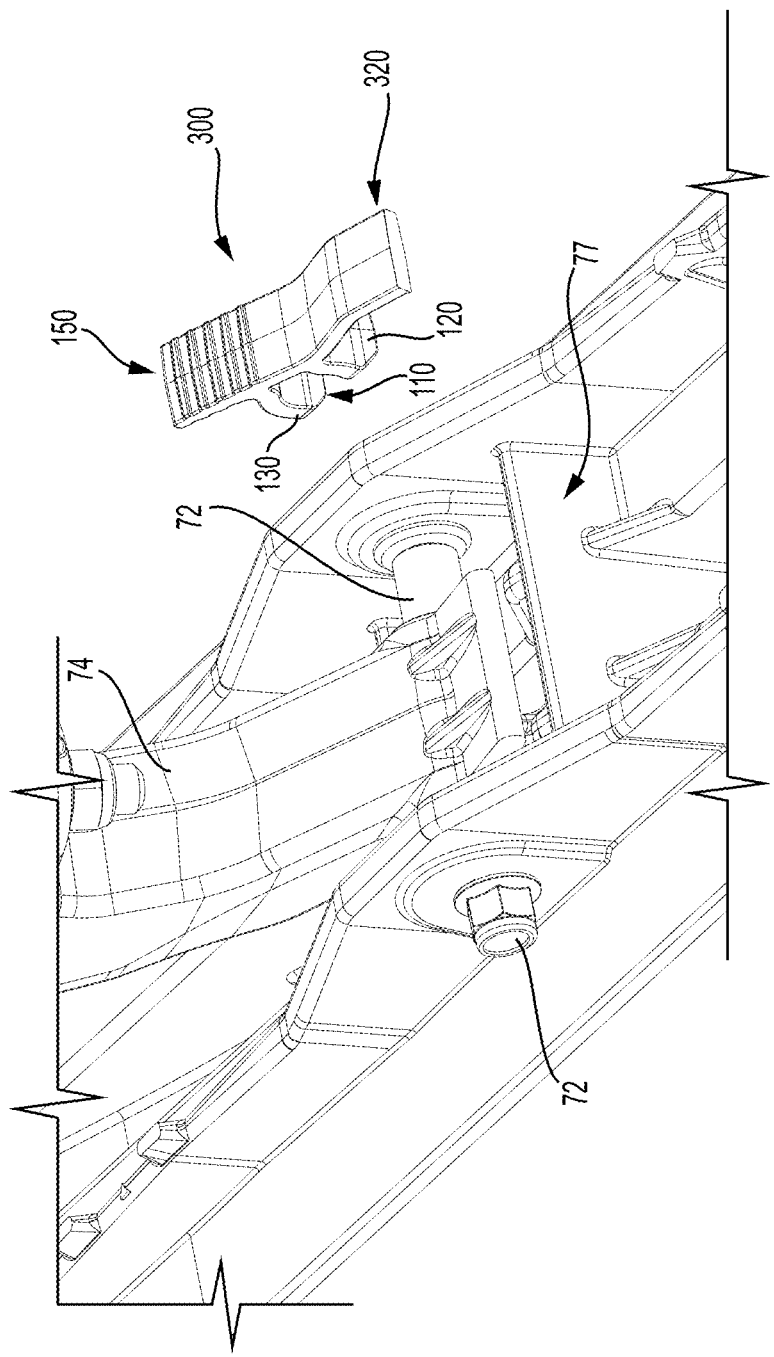
FIG. 18 is a top, front, right side, close-up, perspective view of the ski assembly of FIG. 17.
Figure 19:
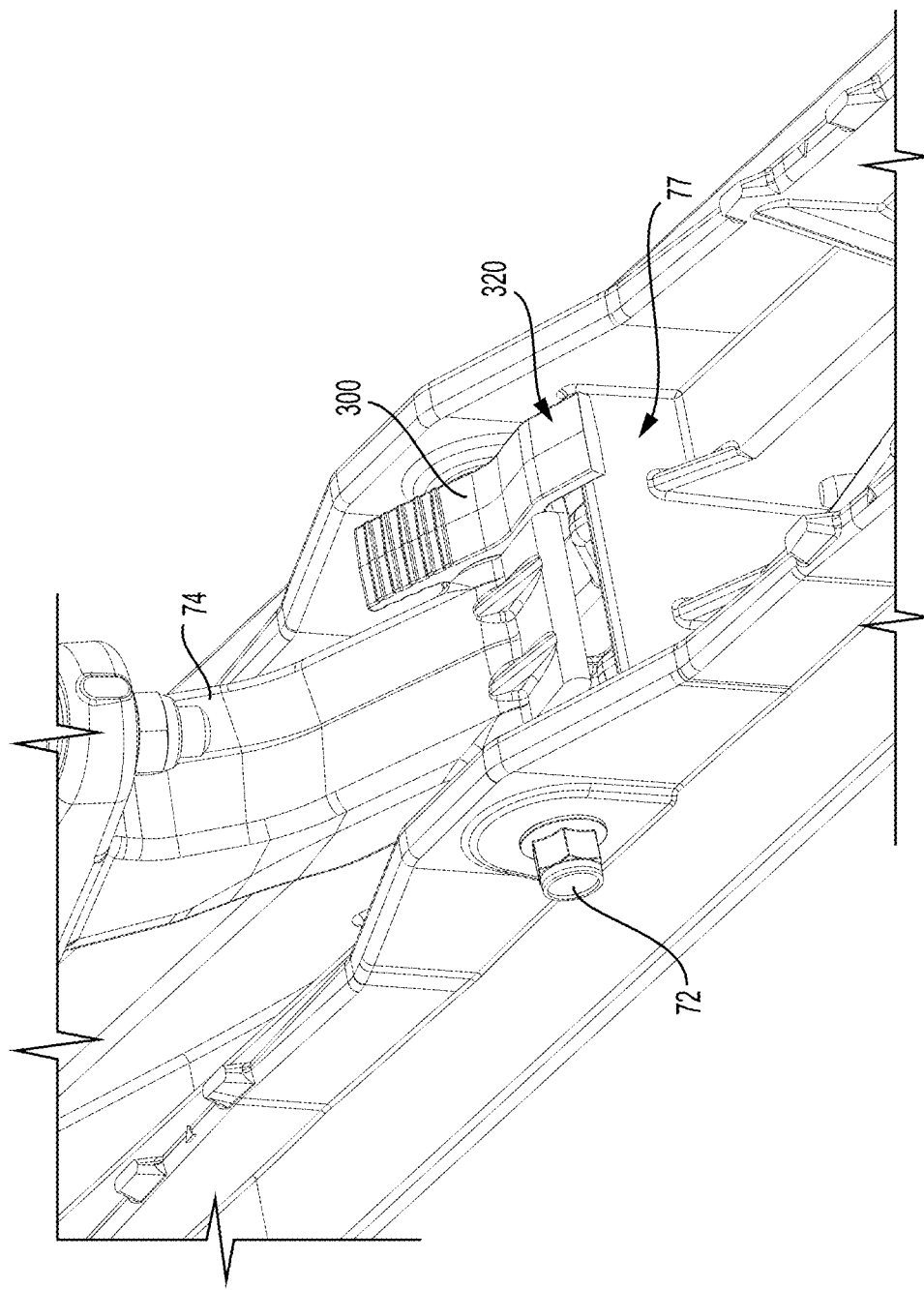
FIG. 19 is the top, front, right side, close-up, perspective view of the ski assembly of FIG. 18, with a clip having been connected to a ski bolt of the ski assembly of FIG. 18.

Another implementation of a clip 300 according to the present technology is illustrated in FIGS. 17 to 19. Elements of the clip 300 that are similar to those of the clip 100 retain the same reference numeral.

In the implementation of the clip 300, the clip 300 does not include the clip body 160 nor does it define the aperture 165 for receiving any fastener for connecting to the ski 70. The bolt 186 and its corresponding nut 188 have therefore been omitted from the ski assembly 170. The clip 300 is selectively connected to the ski bolt 72, in generally the same way described above with respect to the clip 100. When the clip 300 is selectively removed from the ski bolt 72, however, the clip 300 is no longer connected to the ski 70 and does not pivot about the bolt 186 when the clip 300 is removed from or connected to the ski bolt 72.

The clip 300 includes a front portion 320 for aiding in removing the clip 300 from the ski bolt 72. Pulling on either the gripping portion 150 or the front portion 320 or both simultaneously generally upward and rearward or forward, will slightly deform the connecting portion 110 (as described above for clip 100) to disengage the clip 300 from the ski bolt 72.

Figure 20:
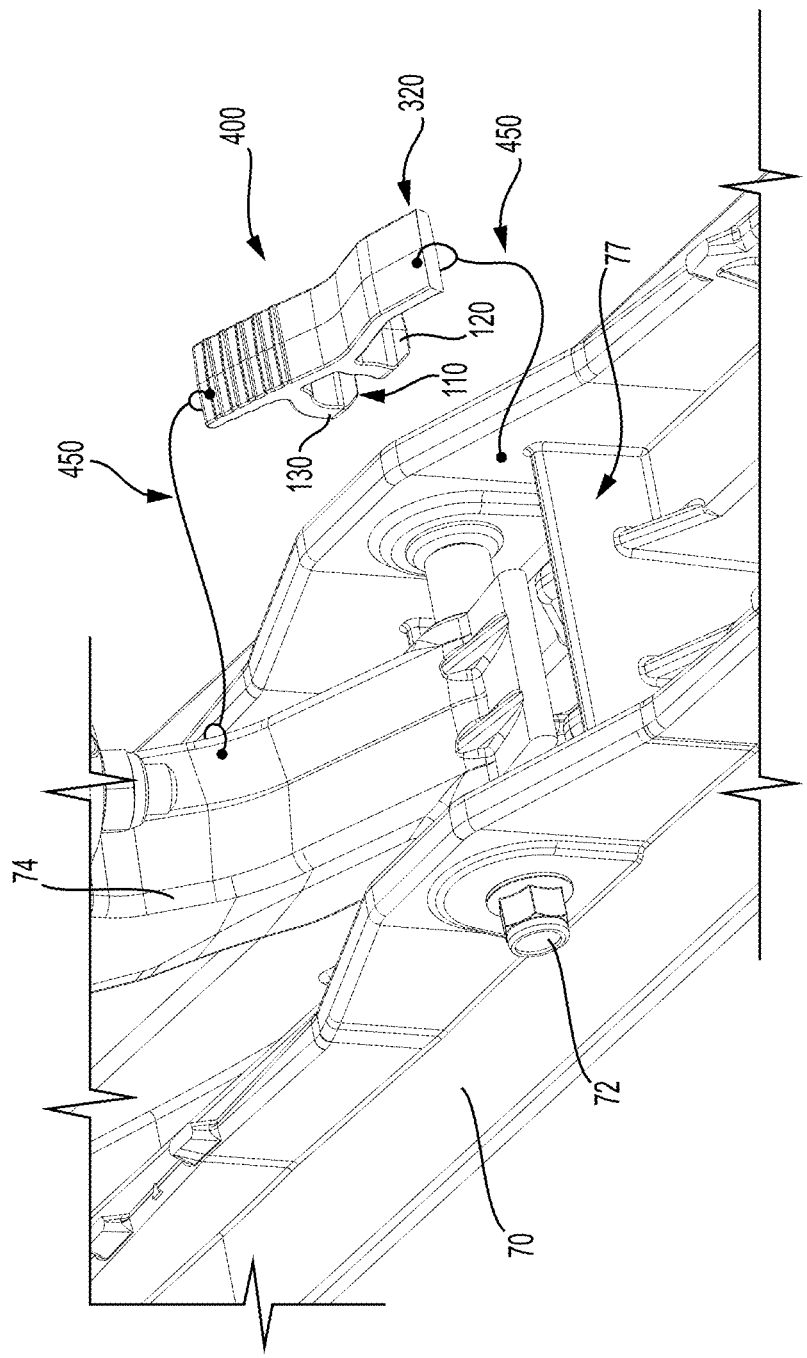
FIG. 20 is a top, front, right side, close-up, perspective view of another implementation of a right ski assembly according to the present technology.
Figure 21:
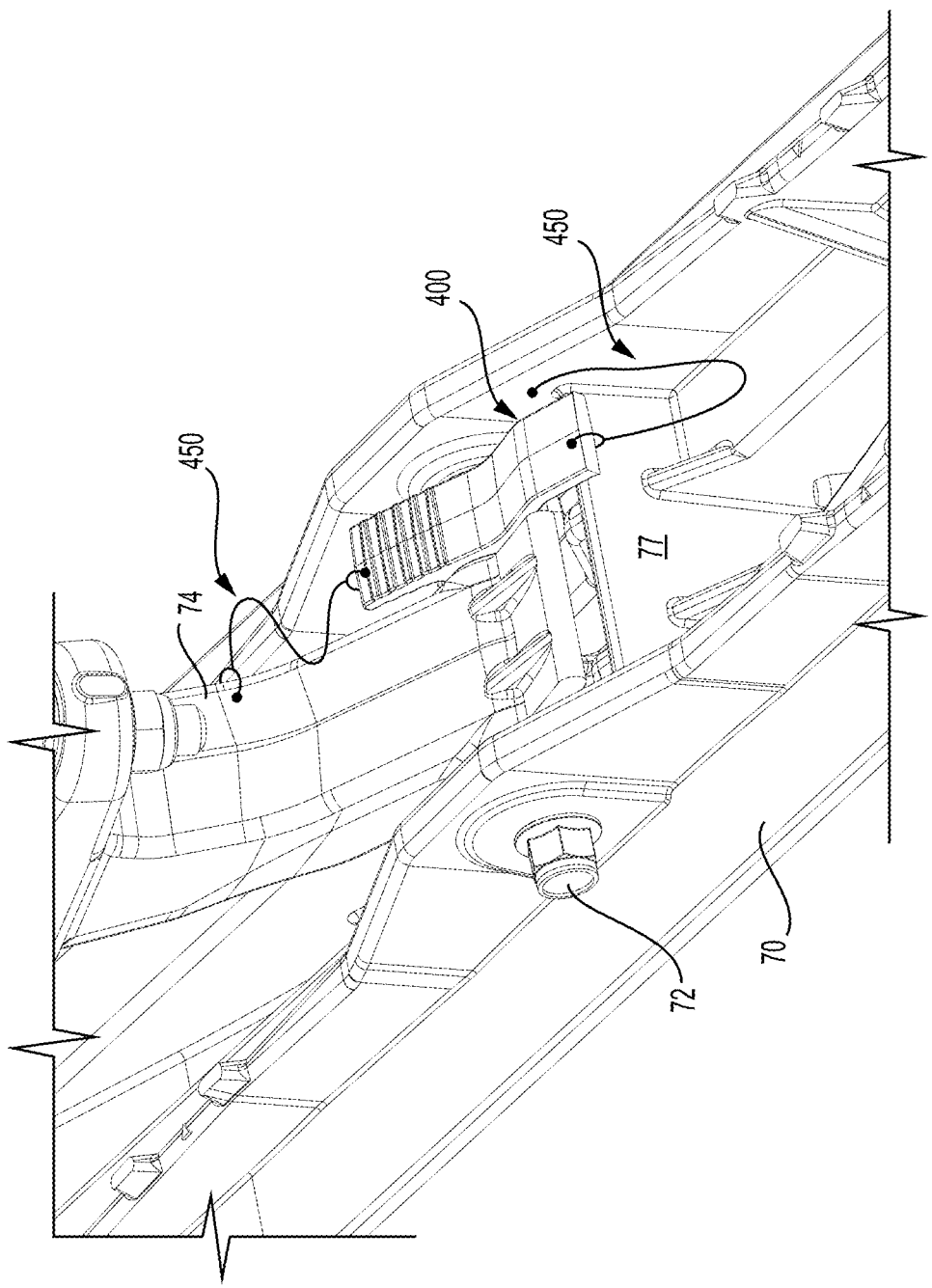
FIG. 21 is the top, front, right side, close-up, perspective view of the ski assembly of FIG. 20, with a clip having been connected to a ski bolt.

Yet another implementation of a clip 400 according to the present technology is illustrated in FIGS. 20 and 21. Elements of the clip 400 that are similar to those of the clips 100 and 300 retain the same reference numeral.

The clip 400 is generally of the same form as the clip 300, described above. The clip 400 further includes two flexible members 450 connected between the clip 400 and the ski 70.

The flexible members 450 are made from metal, but it is contemplated that the flexible members 450 could be formed from rubber or string, for example. The flexible members 450 keep the clip 400 connected to the ski 70, even when the connecting portion 110 is selectively removed from the ski bolt 72, while also allowing the clip 400 to be connected to the ski bolt 72 on either side of the ski leg 74.

It is contemplated that the clip 400 could include more or fewer flexible members 450, connected in front of the ski leg 74, to the rear of the ski leg 74 or to a side of the ski leg 74. It is also contemplated that the flexible members 450 could be selectively connected to the ski 70 and/or the clip 400.

Figure 22:
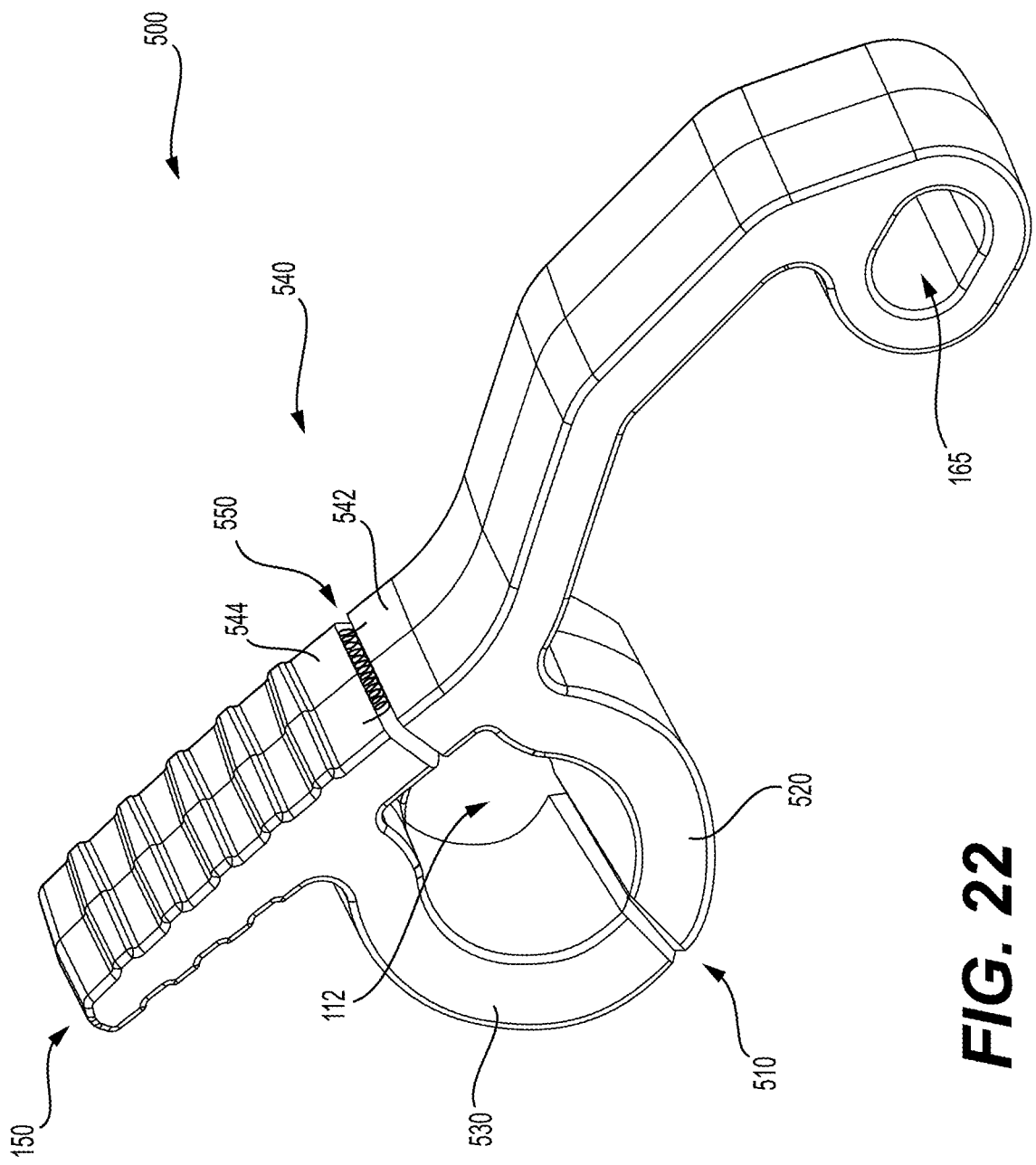
FIG. 22 is a top, front, right side perspective view of yet another implementation of a clip according the present technology.

Yet another implementation of a clip 500 according to the present technology is illustrated in FIG. 22. Elements of the clip 500 that are similar to those of the clip 100 retain the same reference numeral.

The clip 500 includes a connecting portion 510. The connecting portion 510 includes legs 520 and 530 which extend around the bolt 72 when the clip 500 is connected thereto. The connecting portion 510 also includes an intermediate portion 540. The intermediate portion 540 is made up of a forward portion 542 and a rearward portion 544, the two portions 542, 544 being separated and spaced from one another. The intermediate portion 540 also includes a biasing member 550 connected between the forward portion 542 and the rearward portion 544. The biasing member 550 biases the forward leg 520 and the rearward leg 530 toward each other. Specifically, the biasing member biases the bottom end of the forward leg 520 and the bottom end of the rearward leg 530 into contact with each other. In this implementation, the opening span (not separately numbered) is zero. In some implementations, it is contemplated that the legs 520, 530 could not be in contact with each other.

In this implementation, the forward leg 520, the rearward leg 530, and the intermediate portions 542, 544 need not be made of a flexible or resilient material, as the biasing member 550 can be deflected in order to pass the connecting portion 510 over the ski bolt 72 thanks to the biasing member 550. The space 112 is opened between the bottom ends of the first and second legs 520, 530 when the legs 520, 530 are pulled apart against by compressing the biasing member 550. The biasing member 550 allows the legs 520, 530 to be separated sufficiently to pass around the ski bolt 72 when disengaging the clip 500 therefrom.

In the illustrated implementation, the biasing member 550 is a torsion spring 550. It is contemplated that different biasing members 550 could be used depending on the specific implementation, including but not limited to: a leaf spring and a flexible overmolded plastic member.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A clip for selectively setting a position of a snowmobile ski with respect to a corresponding snowmobile ski leg, the ski leg being pivotably and slidably connected to the ski by a ski fastener, the clip comprising:

a connecting portion for selectively connecting the clip to the ski fastener, the connecting portion defining a space for receiving the ski fastener therein, the connection portion being configured to impede lateral movement of the ski relative to the ski leg when the clip is installed on the ski fastener, the space having:

an opening having an opening span, and a central span greater than the opening span,
the connecting portion including at least one resilient member, the at least one resilient member being deflected during connection of the clip to the ski fastener.

2. The clip of claim 1, further comprising a gripping portion extending from the connecting portion.

3. The clip of claim 1, further comprising at least one flexible member connected at a first end to the clip, a second end of the at least one flexible member being adapted for connecting to the ski.

4. The clip of claim 1, wherein the connecting portion is generally C-shaped.

5. The clip of claim 1, wherein a bottom portion of the at least one resilient member is chamfered.

6. The clip of claim 1, wherein a lower end of the at least one resilient member is flared outward away from the space.

7. A kit for adapting a snowmobile ski for adjustable positioning with respect to a corresponding snowmobile ski leg, the kit comprising:
at least one clip according to claim 1;
a template defining:
a bolt aperture, and
a fastener aperture; and
at least one fastener,
the fastener aperture indicating a location to connect the at least one fastener to the ski when the ski bolt is passed through the bolt aperture of the template,
the at least one clip being secured to the ski by the at least one fastener when the at least one fastener is connected to the ski.

8. The clip of claim 1, further comprising:
a clip body extending from the connecting portion; and
wherein:
the clip body defines an aperture for securing the clip to the ski.

9. The clip of claim 8, wherein:
the aperture is an oblong aperture for receiving therethrough a clip fastener connected to the ski; and
the clip, when connected to the ski, is pivotable about the clip fastener.

10. The clip of claim 8, further comprising:
a gripping portion extending from the connecting portion; and wherein:
the gripping portion and the aperture are disposed on opposite sides of the connecting portion.

11. The clip of claim 1, wherein:
the at least one resilient member is a first resilient member;
the connecting portion further comprises a second resilient member; and
the opening span is defined by a minimum distance between a free end of the first resilient member and a free end of the second resilient member.

12. The clip of claim 11, further comprising a rib extending between the first resilient member and the second resilient member, the rib being disposed on a side of the space opposite the opening of the space, the rib having a radius of curvature to match an exterior of the ski fastener.

13. The clip of claim 11, further comprising a rib extending between the first resilient member and the second resilient member; and
wherein the first resilient member, the rib, and the second resilient member form a generally C-shaped connecting portion.

14. A clip for selectively setting a position of a snowmobile ski with respect to a corresponding snowmobile ski leg, the ski leg being pivotably and slidably connected to the ski by a ski bolt, the clip comprising:
a first leg having a first end, a second end and a first arcuate concave surface between the first and second ends;
a second leg having a first end, a second end and a second arcuate concave surface between the first and second ends, the second arcuate concave surface facing the first arcuate concave surface;
an intermediate portion connected to and extending between the second end of the first leg and the second end of the second leg, at least one of the first leg, the second leg, and the intermediate portion being resilient,
the intermediate portion, the first leg and the second leg defining a channel, the channel being opened between the first ends of the first and second legs, the intermediate portion being configured to impede lateral movement of the ski relative to the ski leg when the clip is installed on the ski fastener,
the first and second arcuate concave surfaces being shaped for receiving the ski bolt therebetween,
a distance between the first ends of the first and second legs being less than a central span between the first and second arcuate concave surfaces; and
a gripping portion connected to the intermediate portion.

15. The clip of claim 14, further comprising:
a clip body extending from the intermediate portion; and
wherein:
the clip body defines an aperture for securing the clip to the ski.

16. The clip of claim 15, wherein the gripping portion and the aperture are disposed on opposite sides of the intermediate portion.

17. The clip of claim 14, wherein the intermediate portion comprises:
a forward portion,
a rearward portion separate from the forward portion, and
a biasing member connected between the forward portion and the rearward portion, the biasing member biasing the first leg and the second leg toward each other.

18. The clip of claim 17, wherein:
the biasing member biases the first end of the first leg and the first end of the second leg into contact with each other; and
the channel is opened between the first ends of the first and second legs when the first leg and the second leg are pulled apart against a biasing direction of the biasing member.

\* \* \* \* \*